(12) United States Patent
Babu JD

(10) Patent No.: US 11,756,509 B2
(45) Date of Patent: Sep. 12, 2023

(54) ENHANCED STATE CONTROL FOR ANCHOR-BASED CROSS REALITY APPLICATIONS

(71) Applicant: Magic Leap, Inc., Plantation, FL (US)

(72) Inventor: Praveen Babu JD, Plantation, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 17/157,651

(22) Filed: Jan. 25, 2021

(65) Prior Publication Data

US 2021/0233496 A1 Jul. 29, 2021

Related U.S. Application Data

(60) Provisional application No. 62/966,477, filed on Jan. 27, 2020.

(51) Int. Cl.
*G09G 5/36* (2006.01)
*G02B 27/01* (2006.01)
*F21V 8/00* (2006.01)

(52) U.S. Cl.
CPC ............... *G09G 5/36* (2013.01); *G02B 6/003* (2013.01); *G02B 6/0035* (2013.01);
(Continued)

(58) Field of Classification Search
CPC ........ G09G 5/36; G02B 6/003; G02B 6/0035; G02B 6/0076; G02B 27/0172;
(Continued)

(56) References Cited

U.S. PATENT DOCUMENTS 6,850,221 B1 2/2005 Tickle
10,031,977 B1* 7/2018 Maycock .............. G06F 3/0484
(Continued)

FOREIGN PATENT DOCUMENTS

WO WO 2021/154656 8/2021

OTHER PUBLICATIONS

International Search Report and Written Opinion for PCT Application No. PCT/US2021/014946, dated Apr. 2, 2021.
(Continued)

*Primary Examiner* — Sahlu Okebato
(74) *Attorney, Agent, or Firm* — Seed IP Law Group LLP

(57) ABSTRACT

Cross reality (XR) display devices, such as augmented reality devices, with enhanced state control for anchor-based augmented reality applications are disclosed. In some embodiments, the devices are configured to obtain information identifying applications with respective anchor locations located within a first threshold distance metric of an XR device, with an anchor location corresponding to a real-world location at which virtual content is to be presented; determining respective states, selected from a multitude of states, to be assigned to the applications, the states being determined based on a proximity of the anchor locations to the XR device; implementing the states, with a first application being assigned a state to render virtual content, and with the first application presenting virtual content via the XR device; and in response to movement of the XR device, determining updated states of the one or more applications.

21 Claims, 20 Drawing Sheets

(52) U.S. Cl.
CPC ....... *G02B 6/0076* (2013.01); *G02B 27/0172* (2013.01); *G02B 2027/0127* (2013.01)

(58) Field of Classification Search
CPC ........ G02B 2027/0127; G02B 27/0081; G02B 2027/0174
See application file for complete search history.

(56) References Cited

U.S. PATENT DOCUMENTS

| | | | |
|---|---|---|---|
| 10,838,574 B2* | 11/2020 | Agarawala | G06F 3/04815 |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0235466 A1 | 8/2015 | Schowengerdt | |
| 2015/0309263 A2 | 10/2015 | Abovitz et al. | |
| 2015/0319573 A1 | 11/2015 | Huang et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0140930 A1 | 5/2016 | Pusch et al. | |
| 2016/0274762 A1 | 9/2016 | Lopez et al. | |
| 2019/0188474 A1 | 6/2019 | Zahnert et al. | |
| 2019/0197785 A1* | 6/2019 | Tate-Gans | G06T 19/006 |
| 2021/0110610 A1* | 4/2021 | Xu | G06F 3/011 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Coogan, et al., "Brain-Computer Interface Control in a Virtual Reality Environment and Applications for the Internet of Things," IEEE access, Mar. 15, 2018. <URL:https://ieeexplore.ieee.org/stamp/stamp.jsp?tp=&arnumber=8302482>.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Reitmayr, et al., "Location based Applications for Mobile Augmented Reality," Fourth Australasian User Interface Conference, AUIC 2003. Conferences in Research and Practice in Information Technology, vol. 18. <URL:https://citeseerx.ist.psu.edu/viewdoc/download?doi=10.1.1.13.4723&rep=rep1&type=pdf>.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

FIG. 9B

ENHANCED STATE CONTROL FOR ANCHOR-BASED CROSS REALITY APPLICATIONS

INCORPORATION BY REFERENCE

This application incorporates by reference the entireties of each of the following: U.S. Prov. Patent App. No. 62/966,477; U.S. Prov. Patent App. No. 62/934,485, U.S. patent application Ser. No. 16/593,745, U.S. patent application Ser. No. 16/518,891, U.S. Patent Pub. 2019/0188474, and U.S. Patent Pub. 2019/0197785.

BACKGROUND

Field

The present disclosure relates to display systems and, more particularly, to augmented and virtual reality systems and devices.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. In some cases, this content may be presented to a user via a head-mounted display. In some other cases, this content may be presented to a user via a portable device such as a smart phone or tablet. Because the human visual perception system and the presentation of virtual content is complex, it is challenging to produce AR technology that facilitates a comfortable, natural-feeling, rich presentation of virtual image elements amongst other virtual or real-world imagery elements.

SUMMARY

According to some embodiments, a method implemented by a cross-reality (XR) device is described. The XR device comprises one or more processors and the XR device is configured to present virtual content to a user of the XR device. The method comprises obtaining information identifying one or more applications with respective anchor locations located within a first threshold distance metric of the XR device, wherein an anchor location corresponds to a real-world location at which virtual content is to be presented. Respective states, selected from a plurality of states, are determined to be assigned to the one or more applications, with the states being determined based on a proximity of the anchor locations to the XR device. The states are implemented, with a first application of the one or more applications being assigned a state to render virtual content, and with the first application presenting virtual content via the XR device at a first anchor location. In response to movement of the XR device, updated states are determined for the one or more applications. According to some embodiments, a system comprises one or more processors which is configured to present virtual content to a user of the system, with the system further comprising non-transitory computer storage media storing instructions that, when executed by the one or more processors, cause the one or more processors to perform operations comprising the method above. According to some embodiments non-transitory computer storage media stores instructions that, when executed by a system comprising one or more processors which is configured to present virtual content to a user of the system, causes the one or more processors to perform operations comprising the method above.

Some additional examples are provided below.

Example 1

A method implemented by a cross-reality (XR) device comprising one or more processors, the XR device configured to present virtual content to a user of the XR device, the method comprising: obtaining information identifying one or more applications with respective anchor locations located within a first threshold distance metric of the XR device, wherein an anchor location corresponds to a real-world location at which virtual content is to be presented; determining respective states, selected from a plurality of states, to be assigned to the one or more applications, the states being determined based on a proximity of the anchor locations to the XR device; implementing the states, wherein a first application of the one or more applications is assigned a state to render virtual content, and wherein the first application presents virtual content via the XR device at a first anchor location; and in response to movement of the XR device, determining updated states for the one or more applications.

Example 2

The method of example 1, wherein the virtual content is augmented reality content.

Example 3

The method of example 1, further comprising: providing, to an outside system, information indicative of a location of the XR device; and receiving, from the outside system, information identifying the one or more applications.

Example 4

The method of example 3, wherein the XR device receives the one or more applications for execution.

Example 5

The method of example 3, wherein the XR device receives a subset of the one or more applications, the subset having anchor locations located within a second threshold distance metric of the XR device.

Example 6

The method of example 5, wherein in response to movement of the XR device, a second application is determined to have an anchor location within the second threshold distance metric, and wherein the second application is received from the outside system for execution.

Example 7

The method of example 1, wherein the XR device stores the one or more applications.

Example 8

The method of example 1, wherein the states are determined based on a proximity of the anchor locations to the XR device and a field of view of the XR device with respect to the anchor locations.

Example 9

The method of example 1, wherein determining a state of the first application comprises: identifying a first zone, of a plurality of zones, in which the first application is positioned, the zones being included in a volumetric grid centered on a location of the XR device, wherein the first zone is associated with the determined state.

Example 10

The method of example 9, wherein the first zone indicates the first application is positioned within a display frustum of the XR device, such that the first application is set to an active state associated with rendering virtual content.

Example 11

The method of example 9, wherein a second zone indicates an application is positioned outside of the display frustum of the XR device, such that the application is set to a state not associated with rendering virtual content.

Example 12

The method of example 9, wherein the plurality of zones are associated with states comprising: an application being set to active and associated with rendering virtual content, the application being set to active and not associated with rendering virtual content, the application being set to a sleep state, or the application being set to an unloaded state.

Example 13

The method of example 9, wherein the volumetric grid comprises a plurality of cells, wherein a central cell includes the location of the XR device, and wherein each zone encompasses a respective portion of the cells.

Example 14

The method of example 13, wherein the cells are rectangular, and wherein each cell encompasses a particular real-world area or volume.

Example 15

The method of example 1, wherein movement of the XR device comprises adjustment in position and/or adjustment in pose of the XR device.

Example 16

The method of example 1, wherein the updated states are applied to the one or more applications.

Example 17

The method of example 1, wherein based on movement of the XR device, a new application is identified as being within the first threshold distance metric of the XR device, and wherein a state is determined for the new application.

Example 18

The method of example 1, further comprising filtering the identified applications, wherein filtering comprises: accessing user profile information associated with the user of the XR device, the user profile information indicating preferences of the user; and filtering the identified applications based on the preferences.

Example 19

The method of example 18, wherein filtering the identified applications is performed based on a determination that the identified applications exceed a threshold number of applications.

Example 20

The method of example 19, wherein the threshold number of applications is based on one or more measurers of computational resources of the XR device.

Example 21

The method of example 19, further comprising: identifying greater than a threshold number of applications with determined states associated with being active and rendering virtual content; ranking the threshold number of applications according to one or more metrics; and implementing the determined states, wherein one or more applications of the threshold number of applications present virtual content according to the ranking, and wherein remaining applications of the threshold number of applications are set to a state associated with no rendering virtual content.

Example 22

The method of example 1, wherein the XR device is an augmented reality display device configured to present virtual content on a plurality of depth planes, wherein each depth plane is associated with respective accommodative cues.

Example 23

The method of example 1, wherein the XR device is a mobile device.

Example 24

The method of example 1, wherein the XR device comprises a head-mounted display device configured to provide virtual content from the applications on different depth planes.

Example 25

The method of example 1, wherein the first application is executed by an outside system of one or more computers, and wherein the XR device is configured to receive virtual content from the outside system for presentation.

Example 26

The method of example 1, wherein the first anchor location is determined based on one or more images obtained by one or more outward-facing image sensors of the XR device in comparison with stored persistent information associated with a real-world proximate to the XR device.

Example 27

The method of example 26, wherein the persistent information comprises one or more persistent coordinate frames.

Example 28

The method of example 26, wherein comparing comprises comparing generated descriptors of features included in the images with descriptors associated with the persistent information.

Example 29

The method of example 1, wherein the first application presents virtual content in a prism representing a volume of space, the prism being associated with the first anchor location.

Example 30

A system comprising one or more processors, the system configured to present virtual content to a user of the system, wherein the system further comprises non-transitory computer storage media storing instructions that, when executed by the one or more processors, cause the one or more processors to perform operations comprising the method of examples 1-29.

Example 31

Non-transitory computer storage media storing instructions that, when executed by a system comprising one or more processors and configured to present virtual content to a user of the system, cause the one or more processors to perform operations comprising the method of examples 1-29.

BRIEF DESCRIPTION OF THE DRAWINGS

FIG. 9B illustrates a perspective view of an example of the plurality of stacked waveguides of FIG. 9A.

DETAILED DESCRIPTION

In some embodiments, techniques are provided to enable orchestration of a multitude of applications with anchor locations spread throughout the world or a specific geographic region. As will be described, each application may be executed via a display device to render particular content for presentation to a user. Example content may include augmented reality, virtual reality, or mixed reality, content (referred to herein as "virtual content"). An application may be activated (e.g., executed) by the display device based on the user being proximate to an anchor location (e.g., a real-world location) associated with that application. An example display device for displaying virtual content may include a display device worn by a user, such as display system 60 illustrated in FIG. 9E. Another example display device may include a portable display device for displaying virtual content, such as a smart phone, tablet, and so on. In this specification, display devices for displaying virtual content may be referred to as cross reality devices or "XR" devices.

As described herein, applications may be assigned different states (e.g., active, inactive, not loaded, and so on) as a user traverses the world. In this way, applications may render virtual content to a user to give the illusion that the virtual content persists at real-world locations (e.g., similar to real world appliances or features). There may be a plurality (e.g., tens, hundreds, thousands, hundreds of thousands, or more) of applications and associated anchor locations. Since an XR device may have limited computational resources (e.g., limited memory, limited processing power, and so on), the XR device may be unable to execute all of the applications at the same time. Similarly, the XR device may be unable to store all of the applications. Thus, techniques for orchestrating the assignment of states are desirable. Based on these assigned states, only specific applications may be allowed to render virtual content while other applications may be loaded, unloaded, placed into sleep states, and so on, which the change in state advantageously appearing seamless to a user. Additionally, techniques for rapidly obtaining applications associated with anchor locations proximate to a user are described herein.

Applications

Figure 1:
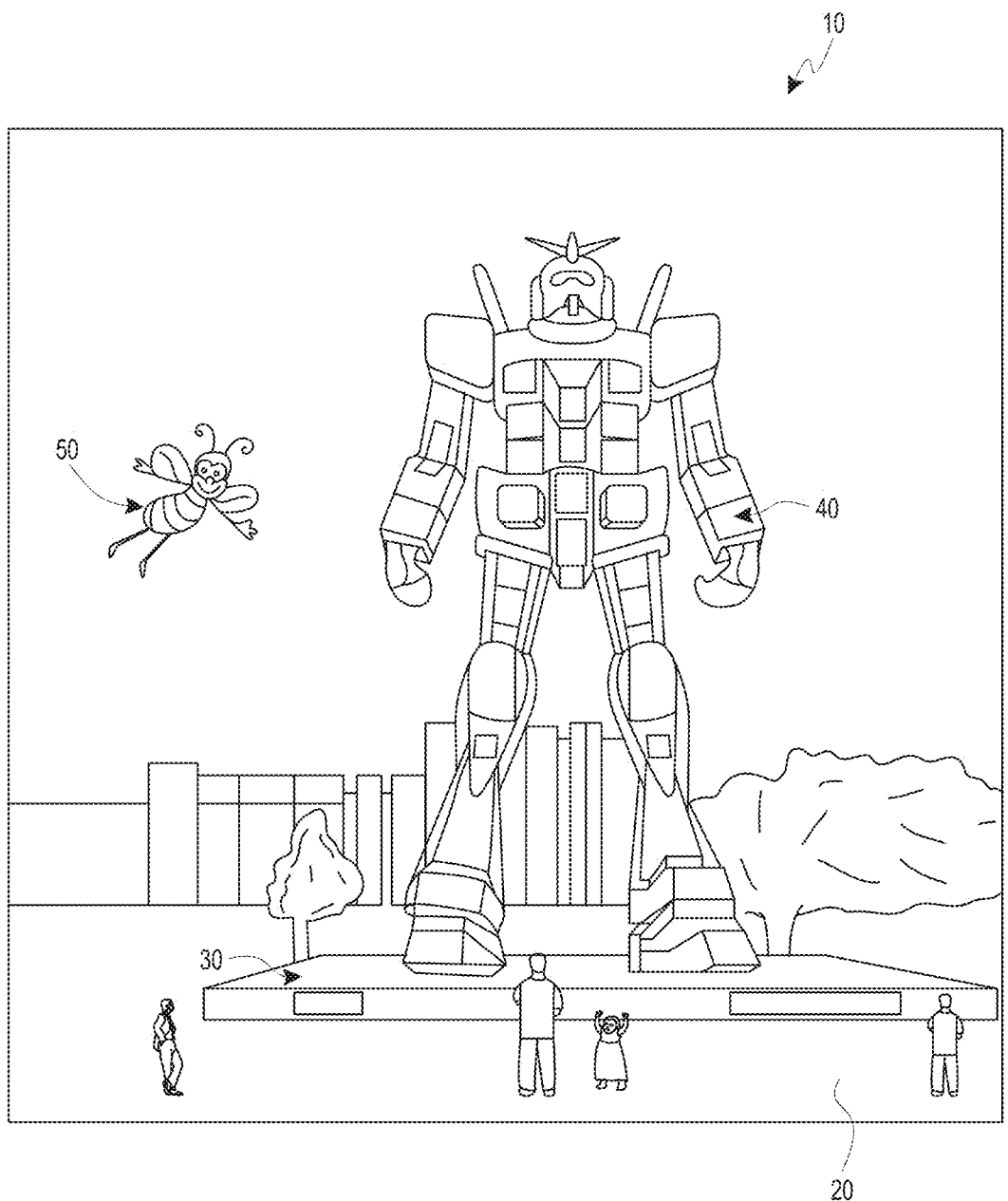
FIG. 1 illustrates a user's view of augmented reality (AR) through an AR device.

Virtual reality content, such as the robot statue illustrated in FIG. 1, may be used to enrich a real-world environment. As another example, virtual content may be used to provide nutritional information for real-world food items a user is viewing. In this example, textual information may be presented in the real-world environment describing the nutritional information. The user may therefore quickly understand benefits, drawbacks, and so on, associated with different food items. As yet another example, virtual content may represent a virtual light switch in a room of a user's domicile. The user may approach the virtual light switch and provide user input to turn the virtual light switch on or off. Advantageously, a device (e.g., an XR device of the user) may provide information to a controller associated with lights in the room. Thus, the interaction with the virtual light switch may cause real-world lights in the room to be adjusted. This may have an example benefit of reducing complexities associated with wiring light switches. Additionally, the virtual light switch may allow for easy adjustment of the placement of the virtual light switch. For example, the user may provide user input to update placement of the virtual light switch to a different portion of the room. As another example, a virtual keypad or lock may be associated with a door. The user may approach the door and the virtual keypad or lock may appear to receive input from the user. The device, upon receiving input from the user, may then provide instructions to a controller on the door to unlock or lock the door.

With respect to the examples above, it may be appreciated that virtual content may provide useful functionality in different avenues of a user's daily life. For example, the nutritional information may allow for an enhanced experience in a store. As another example, the virtual light switch or keypad or lock may allow for an enhanced experience in the user's domicile. Similarly, virtual content may be spread throughout other areas of the world. As an example, virtual content may be presented while the user is in a library. In this example, the virtual content may provide information related to different sections of the library, different books, directions to books which may be of interest to the user, and so on. As another example, virtual content may be presented proximate to stores while the user is traversing city streets. In this example, the virtual content may provide useful information to the user for one or more of the stores. As another example, the user's friend may associate a virtual message to a real-world location (e.g., a particular wall, above a sign store, and so on). Thus, the user may view the virtual message when proximate to the real-world location.

To allow for virtual content to be presented throughout the world, different applications may be executed on an XR device which causes the XR device to present different virtual content. An application, as described herein, may enable an XR device to render virtual content for presentation to a user. The application may include virtual content or may obtain particular virtual content via wired or wireless communications (e.g., from a network address). Advantageously, the applications described herein may be anchored to one or more real-world locations.

Thus, an XR device may execute an application when the user is positioned proximate to an anchor location associated with the application. With respect to the example of a user's domicile, a particular application may cause the XR device to render a virtual light switch in a particular room. In this example, the XR device may cause the particular application to execute when the user is within the particular room or within a threshold distance of the particular room. With respect to the example of a keypad or lock, the ER device may cause the particular application to execute when the user is, e.g., within a threshold proximity to a door.

The applications described herein may be obtained from an online application store (e.g., as an downloadable an "app"), such that the user may cause certain applications to be installed (e.g., loaded) on the user's XR device, and reside locally on the device. The applications may also be automatically obtained by the XR device, e.g., obtained on demand as needed. For example, as the user traverses the world, the user device may be positioned proximate to certain anchor locations. In this example, the user device may obtain applications associated with the anchor locations. As an example, the applications may be obtained via a wireless connection (e.g., a cellular connection, such as LTE or 5G; a Wi-Fi connection; and so on). Thus, as the user moves about the world, different applications may be obtained for execution. In this way, associated virtual content may be rendered by the applications such that it appears fixed in the real-world (e.g., anchored on real-world locations).

Application Anchor Locations

As described above, an application may have one or more associated anchor locations. An anchor location may be a real-world location at which the application is to present virtual content. In this way, a user may perceive the virtual content as being located at the anchor location. For example, a first anchor location associated with a nutrition application may be proximate to a first type of fruit in a store while a second anchor location may be proximate to a second type of fruit. In some embodiments, the real-world location may represent a global navigation satellite system (GNSS) location (e.g., global positioning system location). Thus, the application may render virtual content to be perceived at this GNSS location.

In some embodiments, an application may render virtual content in a bounded volume which may be referred to as a "prism." Each prism may have characteristics and properties that allow an application to manage and display the prism in a mixed reality environment such that the application may manage the placement and display of the virtual content in the mixed reality environment by managing the prism itself. For example, an anchor location of virtual content may represent the anchor location associated with a prism that includes the virtual content. An application may optionally be associated with one or more prisms. In some embodiments, prisms may be set to not overlap which each other such that each prism represents a distinct volume.

Each prism may have characteristics and properties that allow an application that manages prisms, which may be referred to as a "prism manager," to control the display of virtual content associated with one or more prisms, in the mixed reality environment. In some embodiments, a prism may be analogous to a "window" in a 2D display environment. In a 2D environment, a window may be used to define location and menu structures and to display 2D content. Likewise, in a 3D environment of an XR system, the prism allows a prism manager to provide control relating to, for example, content locations, 3D window behavior, and menu structures around the display of 3D content. For example, controls may include at least placing the virtual content in a particular location in the user's environment, removing virtual content from the environment, copying the virtual content, and/or placing the copy in a different location, and so on.

Additional description related to prisms is included in U.S. Patent Pub. 2019/0197785 and U.S. Prov. Patent App. No. 62/934,485, which form part of the disclosure as if set forth herein.

In some embodiments, the real-world location may correspond to a particular spatial location in the real-world as determined from distinguishable features of the real-world. As an example, distinguishing features may include relatively small features such as corners, marks on a wall, edges, letters (e.g., the letter "s"). Combinations of these distinguishing features may be used to accurately specify a real-world location. As an XR device is moved about the world, the XR device may obtain images of the world via one or more outward facing image sensors. These obtained images may depict distinguishing features which may be used to determine an anchor location associated with an application. The distinguishing features may be compared to stored, or otherwise accessible, persistent information about the physical world. In this way, the persistent information may be compared to the features included in the obtained images. Based on the comparisons, a substantially precise anchor location may be determined.

In some embodiments, persistent information about the physical world may be represented as persistent coordinate frames (PCFs). A PCF may be defined based on one or more points which represent features recognized in the physical world. The features may be selected such that they are likely to be the same from user session to user session of XR devices. For example, the features may be determined to likely be persistent. PCFs may exist sparsely, providing less than all of the available information about the physical world, such that they may be efficiently processed and transferred. The features may be recognized by an XR device, as an example, based on comparisons of descriptors generated based on the features. As an example, a descriptor may be generated for a feature (e.g., a particular distinguishing feature) or an area surrounding the feature as depicted in an image obtained by the XR device. The descriptor for the feature may then be compared to descriptors for features included in one or more PCFs (e.g., PCFs associated with a location of the XR device). While descriptors are described, in some embodiments the XR device may compare patches surrounding features.

The XR device may thus obtain images of the physical world and determine an anchor location based on comparisons of features in the images and features associated with one or more PCFs. In some embodiments, the XR device may store, and/or generate, one or more persistent maps representing real-world locations as the XR device is in use. Thus, the XR device may compare the persistent maps to PCFs to accurately identify a specific anchor location. In this way, the XR device may cause presentation of virtual content at the specific anchor location. As examples, anchor locations may include locations above a sign, to the left of a particular window of a building, on a certain shelf in a library, at a particular location on a wall located in a particular room, and so on.

Figure 14:
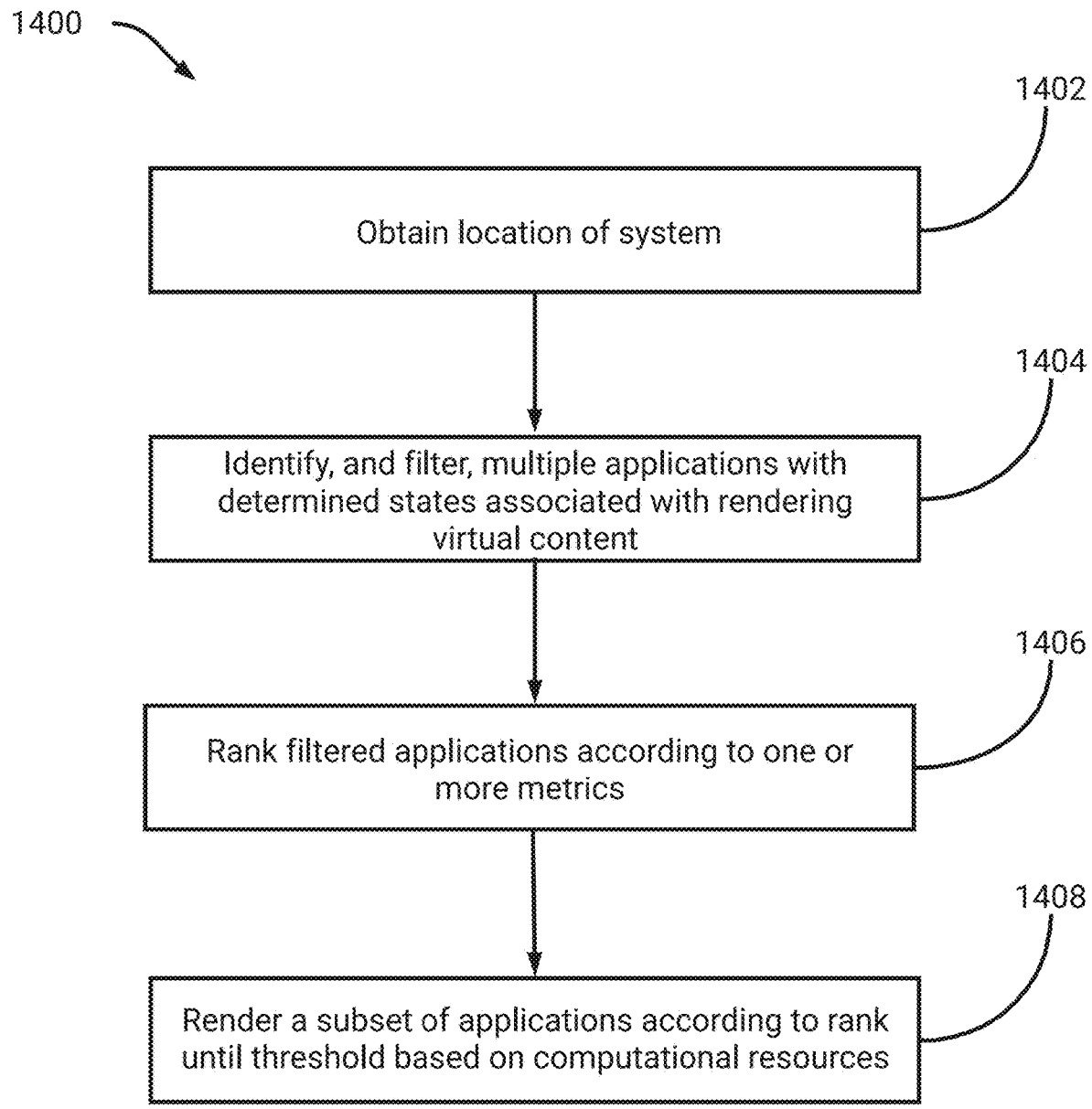
FIG. 14 is a flowchart for an example process for rendering applications based on a ranking of the applications.

Additional description related to determining an anchor location is included, at least, in FIGS. 6B and 14 of U.S. patent application Ser. No. 16/593,745, which forms part of the disclosure as if set forth herein.

Orchestrating Application States

As discussed herein, Applications may have one or more anchor locations spread throughout the world. For example, as a user walks down a city street, there may be multitudes of anchor locations for different applications proximate to the user. As may be appreciated, an XR device may be unable to execute each of the multitude of applications at a same time. For example, the XR device may have limited memory, computation resources, and/or it may reduce a user experience to present virtual content from all of the applications.

Therefore, it may execute a changing subset of applications as the user moves about the city street based on available computational resources. Without the techniques described herein, certain virtual content may be perceived by the user to fall in and out of existence in the real-world. This may have the deleterious effect of reducing realism associated with the virtual content. For example, and as described above, the virtual content may be designed to persist in the real-world. However, without techniques to orchestrate execution of applications, the virtual content may not be perceived as persisting due to limited computational resources.

Advantageously, and according to some embodiments, applications may be assigned different states based on the user's proximity to the applications. Additionally, applications may be assigned different states further based on a perspective of the user or XR device with respect to the real-world. For convenience of description, in the present disclosure, an application is described as being proximate to a user if the application is associated with an anchor location which is proximate to the user. Similarly, this disclosure describes an application as being within a field of view, or perspective, of a user if an associated anchor point is within the field of view, or perspective, of the user or XR device. For example, an application may be considered within a field of view of a user or XR device if the application is configured to render virtual content such that it is perceived at an anchor location within the field of view.

As an example of orchestrating states, applications which are determined to be proximate to the user, such as applications with anchor locations within a threshold distance of the user, may be assigned an "active+render" state. As will be described, the active+render state may cause the applications to render virtual content for presentation to the user. As another example, applications which are determined to be proximate to the user and which are determined to be within a field of view (e.g., within the display frustum) may be assigned an "active+render" state. Other applications proximate to the user, which are not within the field of view, may be assigned a different state. For example, the other applications may be assigned as "active+no render," or "sleeping," state. In this example, the other applications may not render virtual content. Thus, computational resources of the XR device may be conserved. In some embodiments, a prism associated with an application may be assigned a state. The associated application may then implement the state. For example, if a prism is assigned "active+render," the associated application may present virtual content to a user.

Additionally, the XR device may obtain (e.g., download) applications as a user moves about the real-world. For example, the XR device may identify applications with anchor locations within a threshold distance of the XR device. In this example, the XR device may provide location information to an outside system. In response, the outside system may identify applications within the threshold distance. The XR device may then obtain (e.g., load) the identified applications for execution on the XR device, for example from local storage or from the outside system via a wired or wireless connection. A state of each application may be updated, for example to "sleeping" or "active", based on movement of the XR device. As an example, as the XR device moves closer to an application, the application may be updated to "active." In contrast, as the XR device moves further from an application, the application may be updated to "sleeping," or the application may be unloaded from XR device (e.g., removed from local memory).

Additional description related to downloading applications is described, at least, in FIG. 64 of U.S. Prov. Patent App. No. 62/934,485, which forms part of this disclosure as if set forth herein.

In this way, many (e.g., ten, hundreds, thousands, or hundreds of thousands or more) of applications may be seamlessly loaded by an XR device based on a location of the XR device and/or point of view of the XR device. As the XR device moves about the real-world, previously loaded applications may be discarded (e.g., deleted) by the XR device. In this way, the XR device may obtain applications with anchor locations within a threshold distance of the XR device. Thus, virtual content may be perceived as persisting in the real-world based on the XR device's orchestration of the applications.

FIGS. 2-9E below describe example details related to augmented reality devices and systems capable of outputting virtual content to users. Advantageously, the augmented reality devices and systems may output virtual content on different depth planes. Each depth plane may be associated with different accommodative cues, such that virtual content may be perceived as positioned at different depths from a user. While the description below describes augmented reality devices with multiple depth planes, such as display system 250, as a particularly advantageous example of a display device for providing virtual content using the application orchestration techniques disclosed herein, it will be appreciated that the techniques described herein may be implemented on XR devices generally.

For example, a user device (e.g., a mobile device, tablet, and so on) may present virtual content to a user. In this example, the user device may use one or more outward-facing imaging sensors to obtain images of a real-world environment. The user device may present the real-world environment via a display of the user device and include rendered virtual content in the presentation. In this way, the user may move the user device about the real-world environment and view virtual content included therein.

Reference will now be made to the drawings, in which like reference numerals refer to like parts throughout. Unless indicated otherwise, the drawings are schematic and not necessarily drawn to scale.

Example Augmented Reality Display Systems

Figure 2:
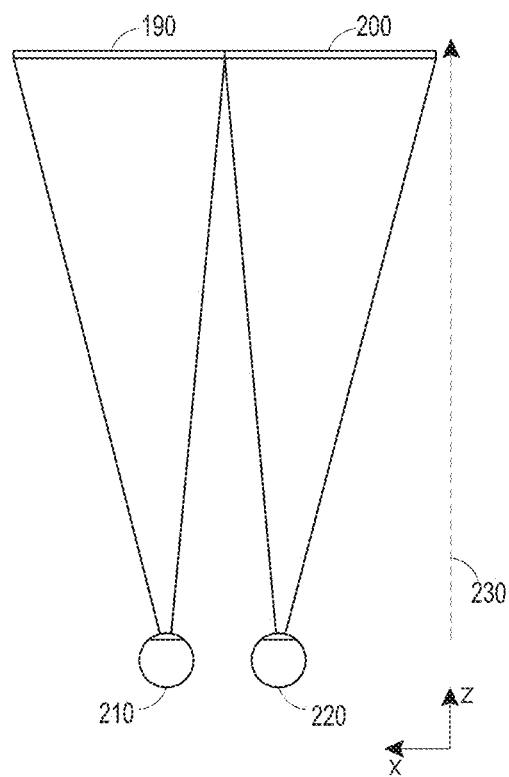
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
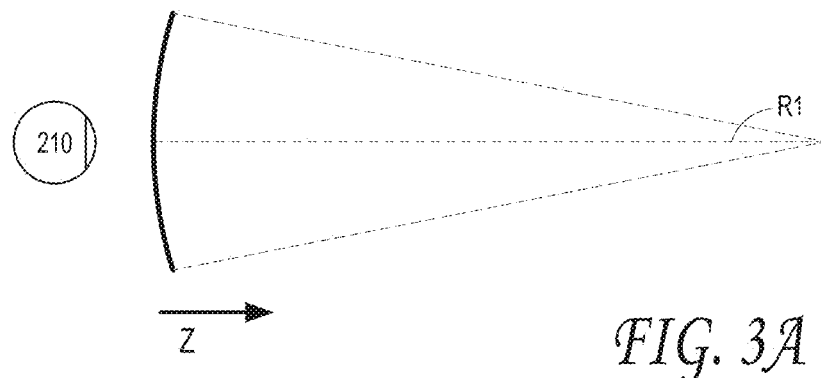
FIGS. 3A-3C illustrate relationships between radius of curvature and focal radius.
Figure 3B:
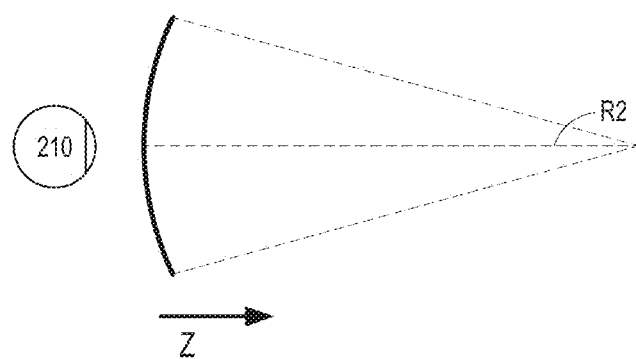
Figure 3C:
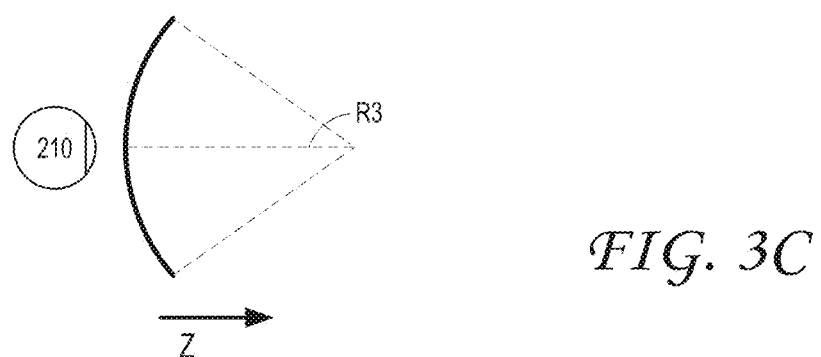

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
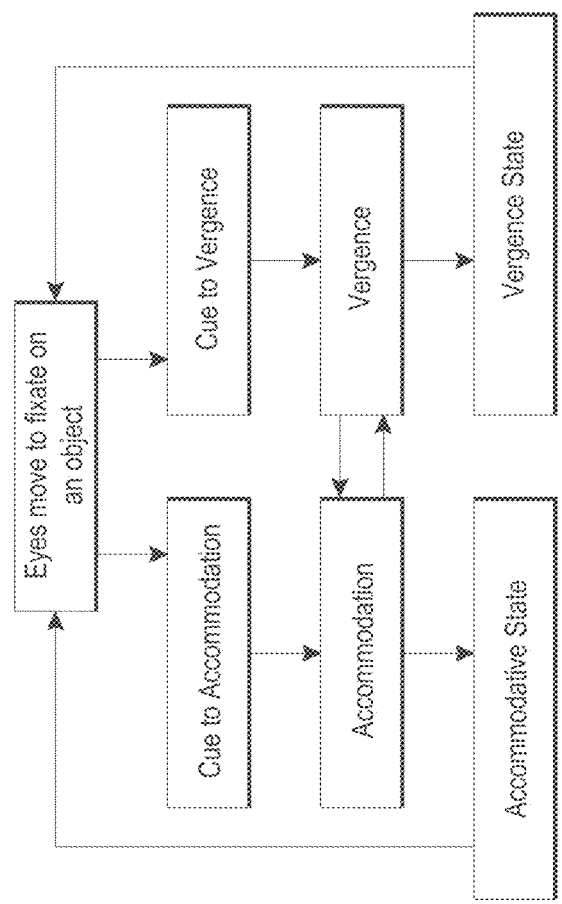
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
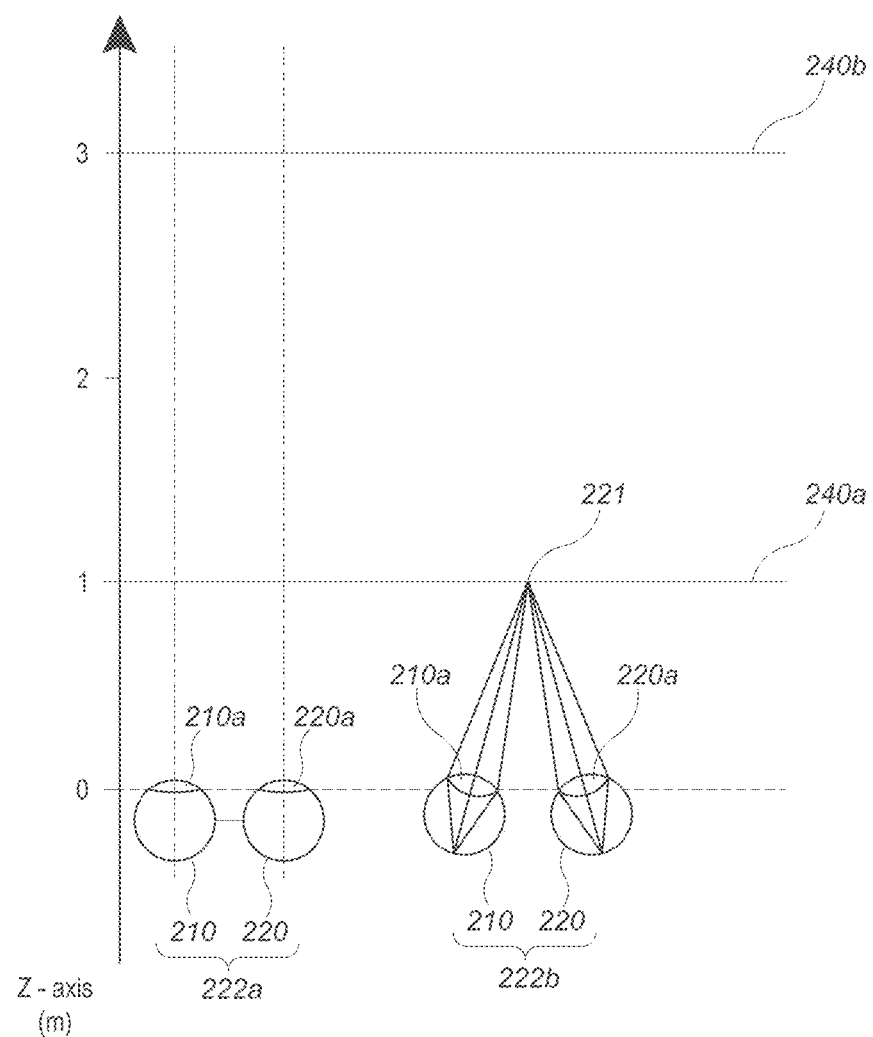
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
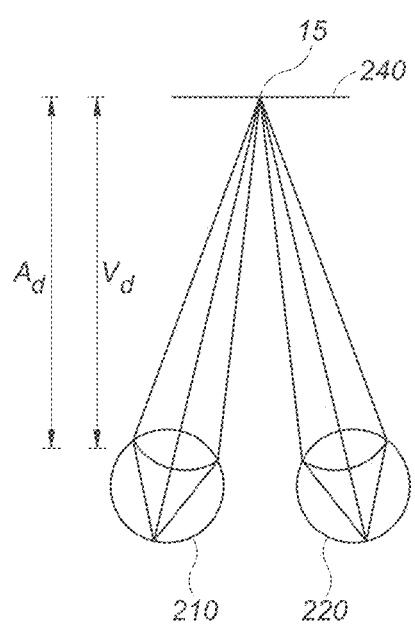
FIG. 4C illustrates an example of a representation of a top-down view of a user viewing content via a display system.
Figure 4D:
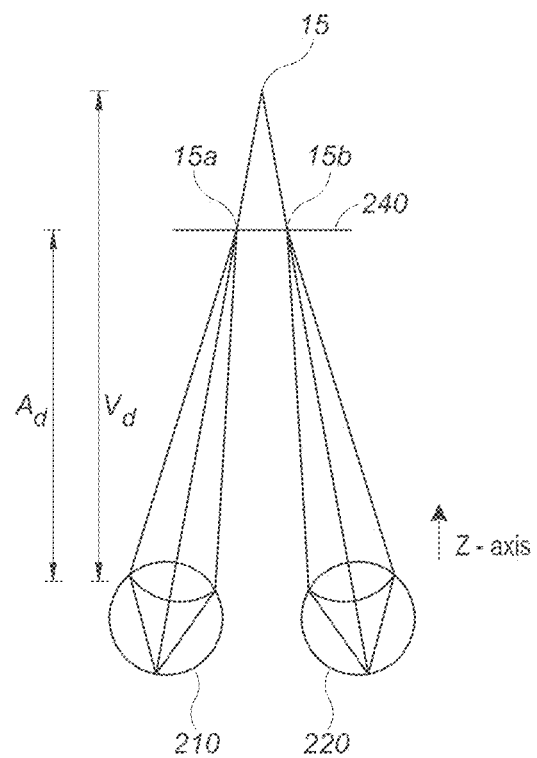
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
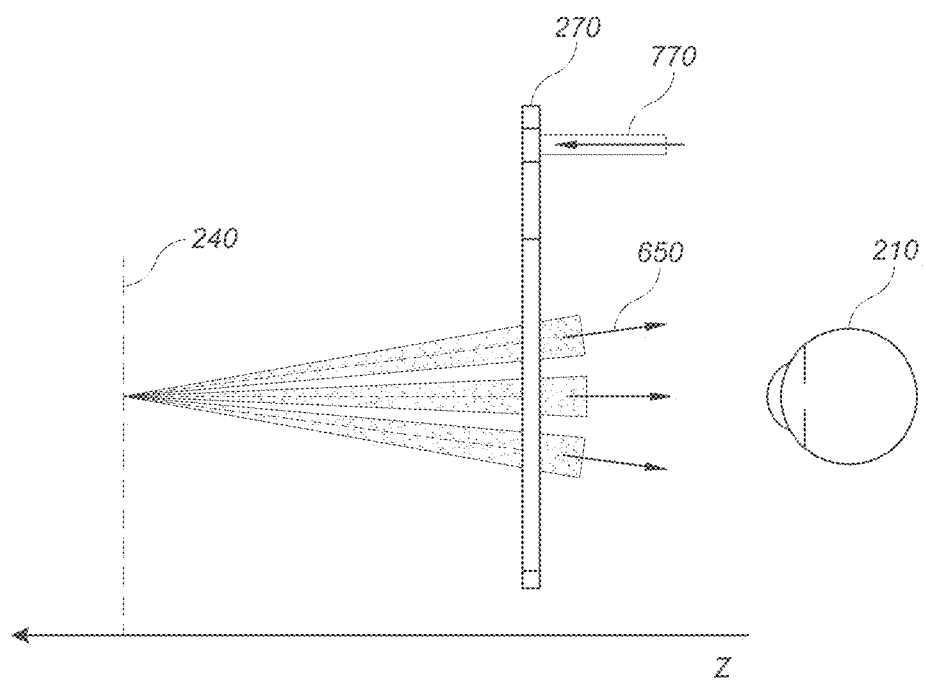
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
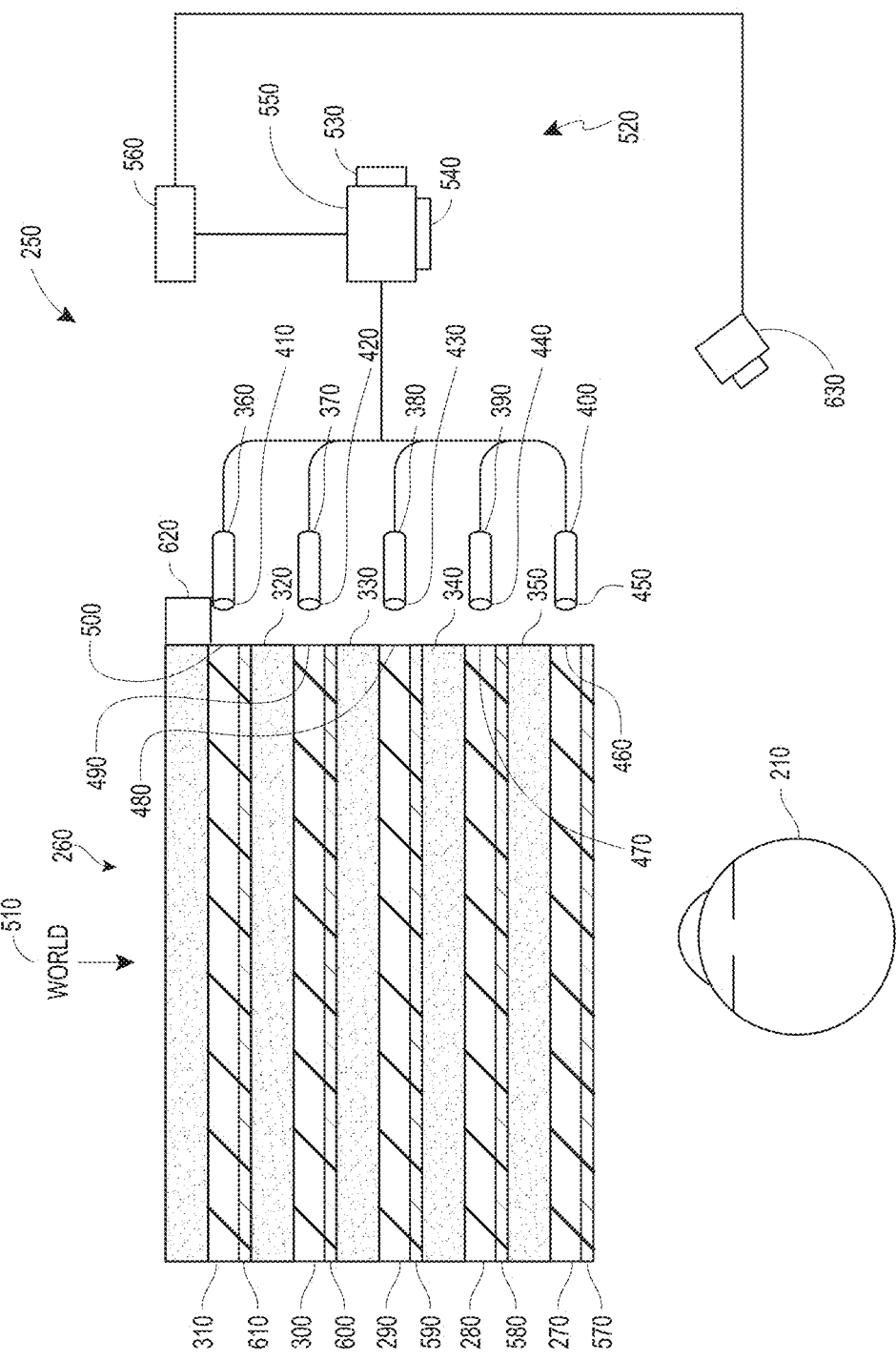
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projection system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In some other embodiments, the spatial light modulator may be a MEMS device, such as a digital light processing (DLP) device. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9E) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame or support structure 80 (FIG. 9E) and may be in electrical communication with the processing modules 140 and/or 150, which may process image information from the camera assembly 630. In some embodiments, one camera assembly 630 may be utilized for each eye, to separately monitor each eye.

The camera assembly 630 may, in some embodiments, observe movements of the user, such as the user's eye movements. As an example, the camera assembly 630 may capture images of the eye 210 to determine the size, position, and/or orientation of the pupil of the eye 210 (or some other structure of the eye 210). The camera assembly 630 may, if desired, obtain images (processed by processing circuitry of the type described herein) used to determine the direction the user is looking (e.g., eye pose or gaze direction). In some embodiments, camera assembly 630 may include multiple cameras, at least one of which may be utilized for each eye, to separately determine the eye pose or gaze direction of each eye independently. The camera assembly 630 may, in some embodiments and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
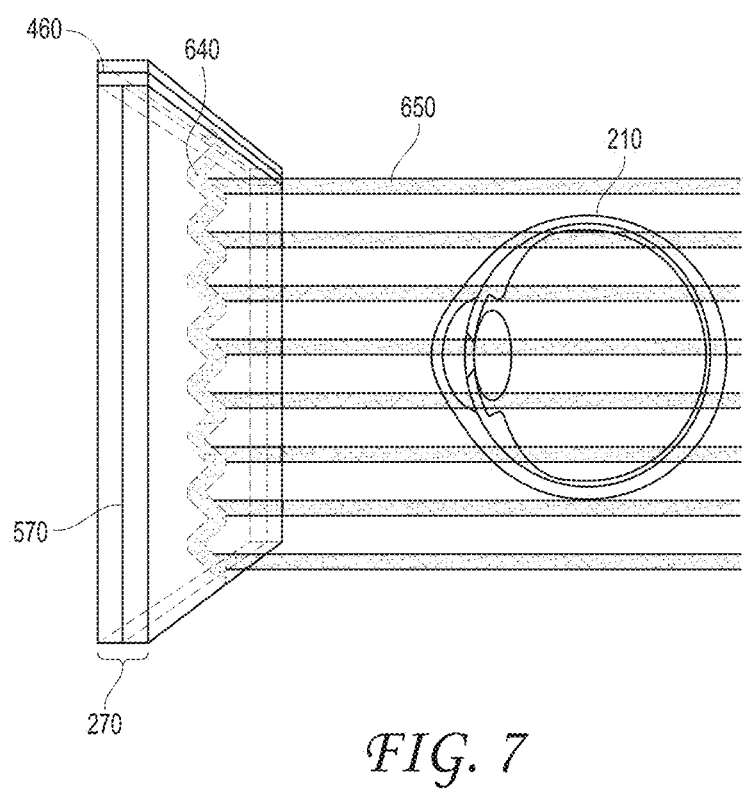
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
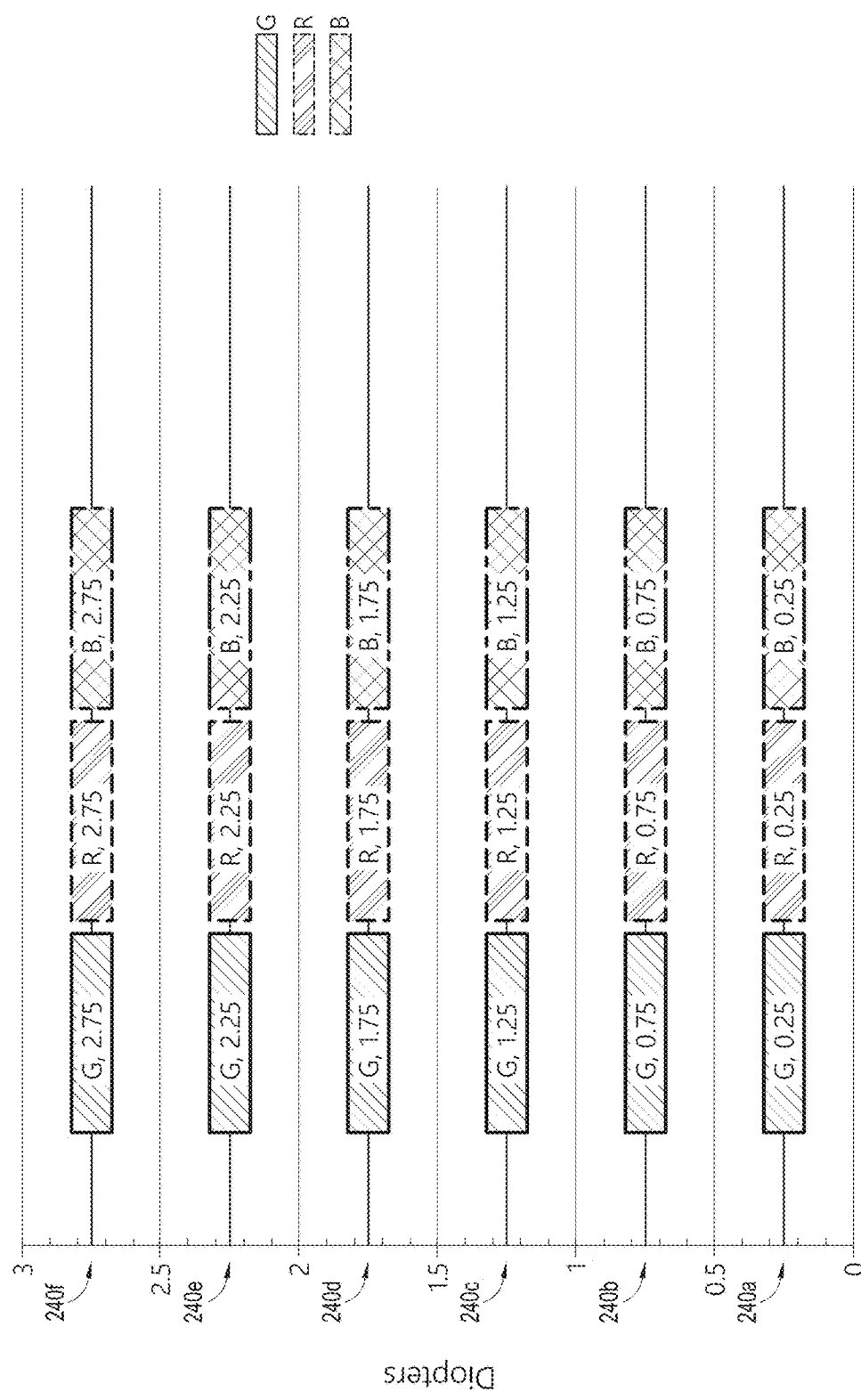
FIG. 8 illustrates an example of a stacked eyepiece in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
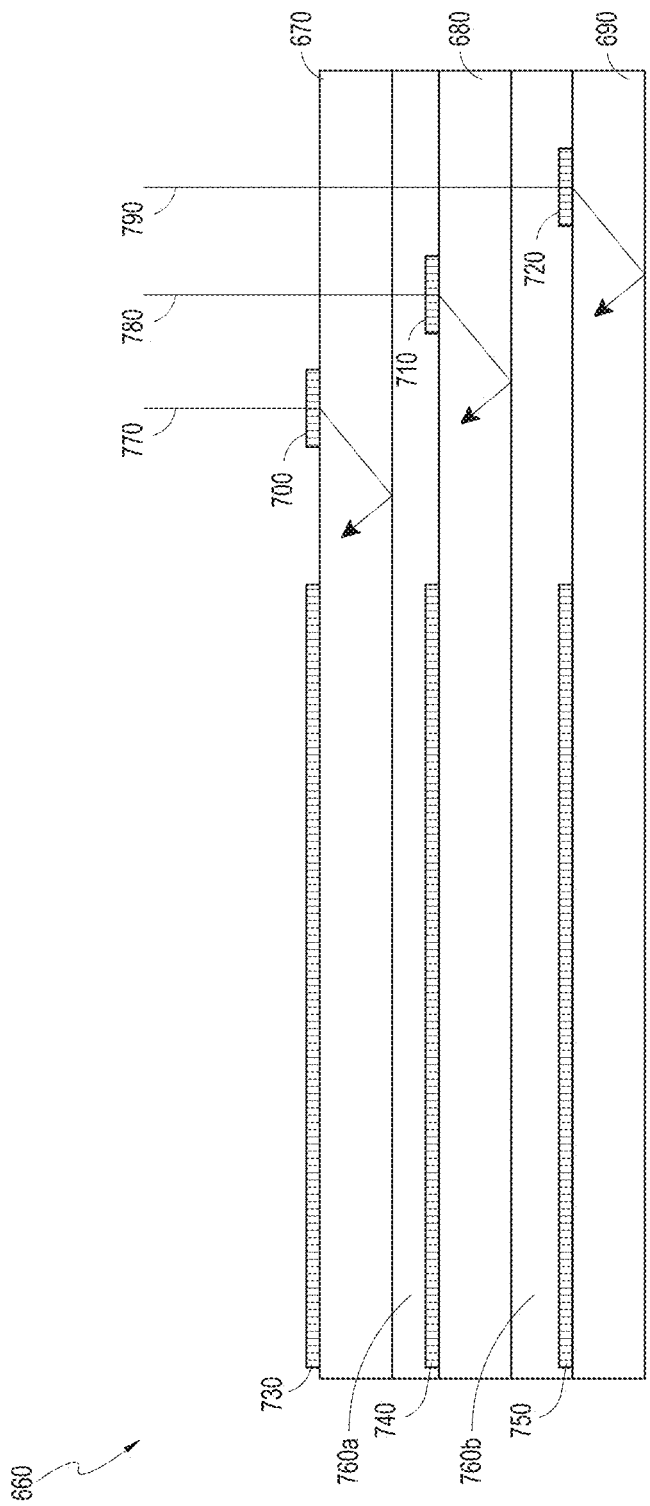
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another, as seen in the illustrated head-on view in a direction of light propagating to these in-coupling optical elements. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
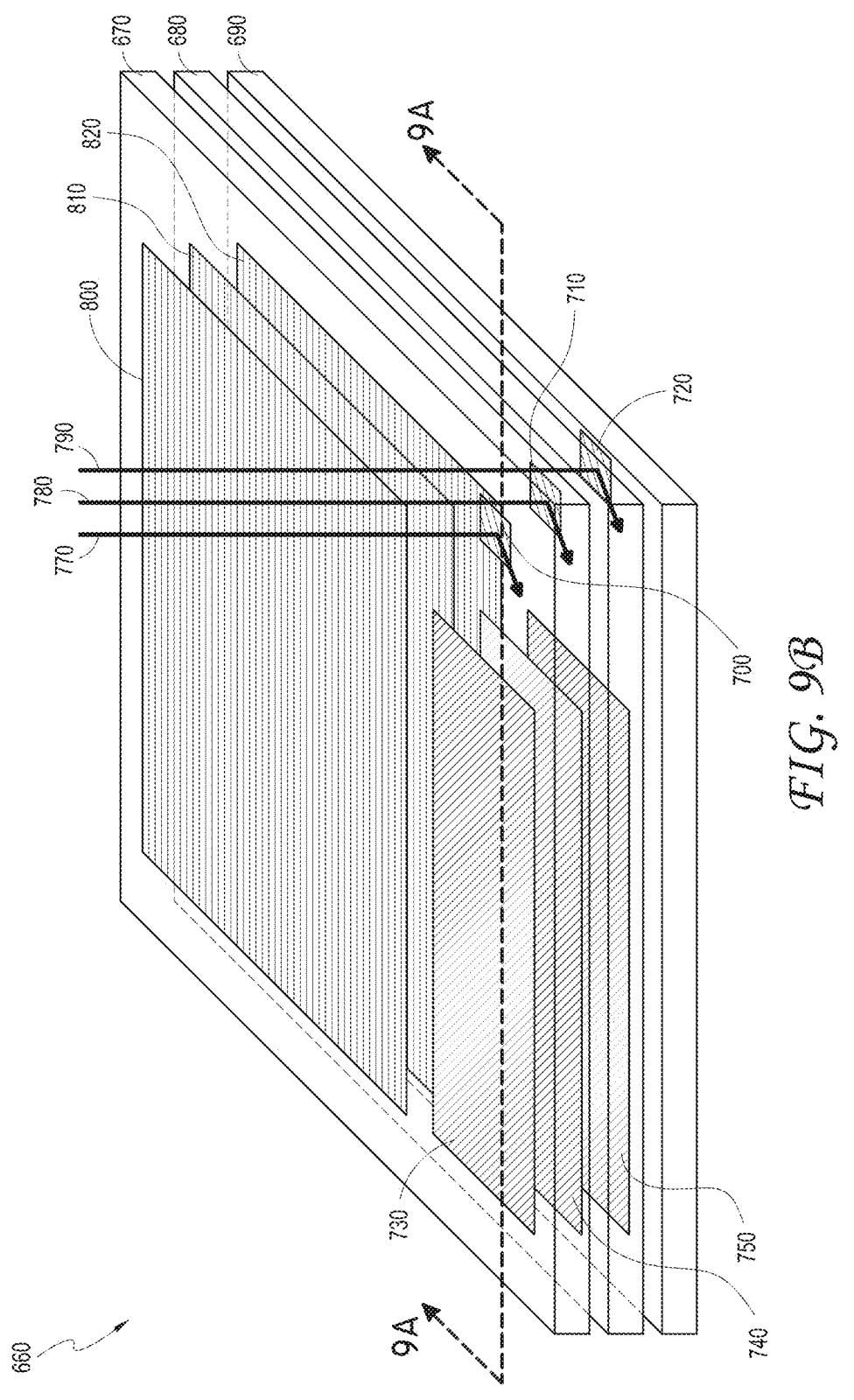

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
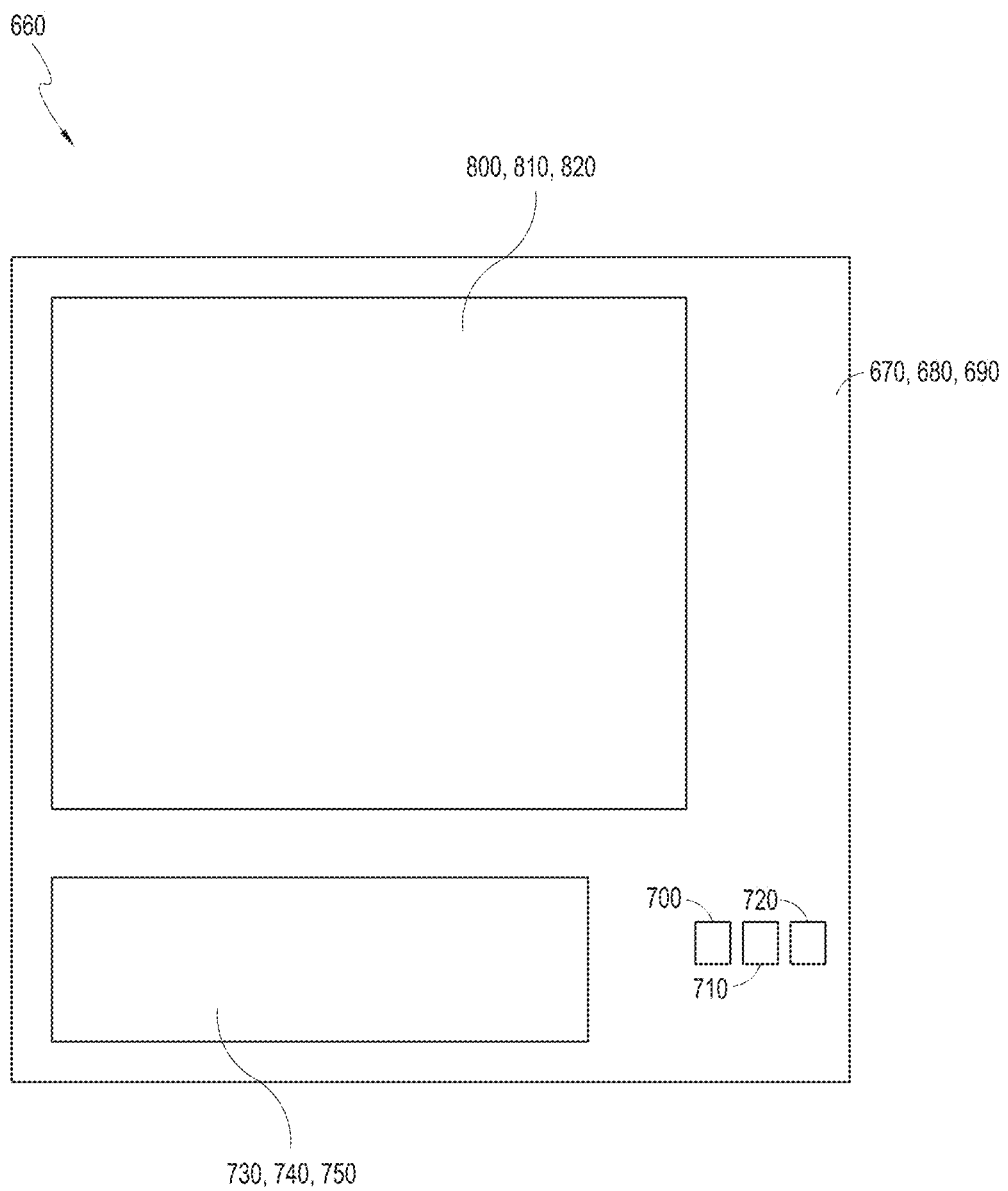
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub-pupils.

It will be appreciated that the spatially overlapping areas may have lateral overlap of 70% or more, 80% or more, or 90% or more of their areas, as seen in the top-down view. On the other hand, the laterally shifted areas of less than 30% overlap, less than 20% overlap, or less than 10% overlap of their areas, as seen in top-down view. In some embodiments, laterally shifted areas have no overlap.

Figure 9D:
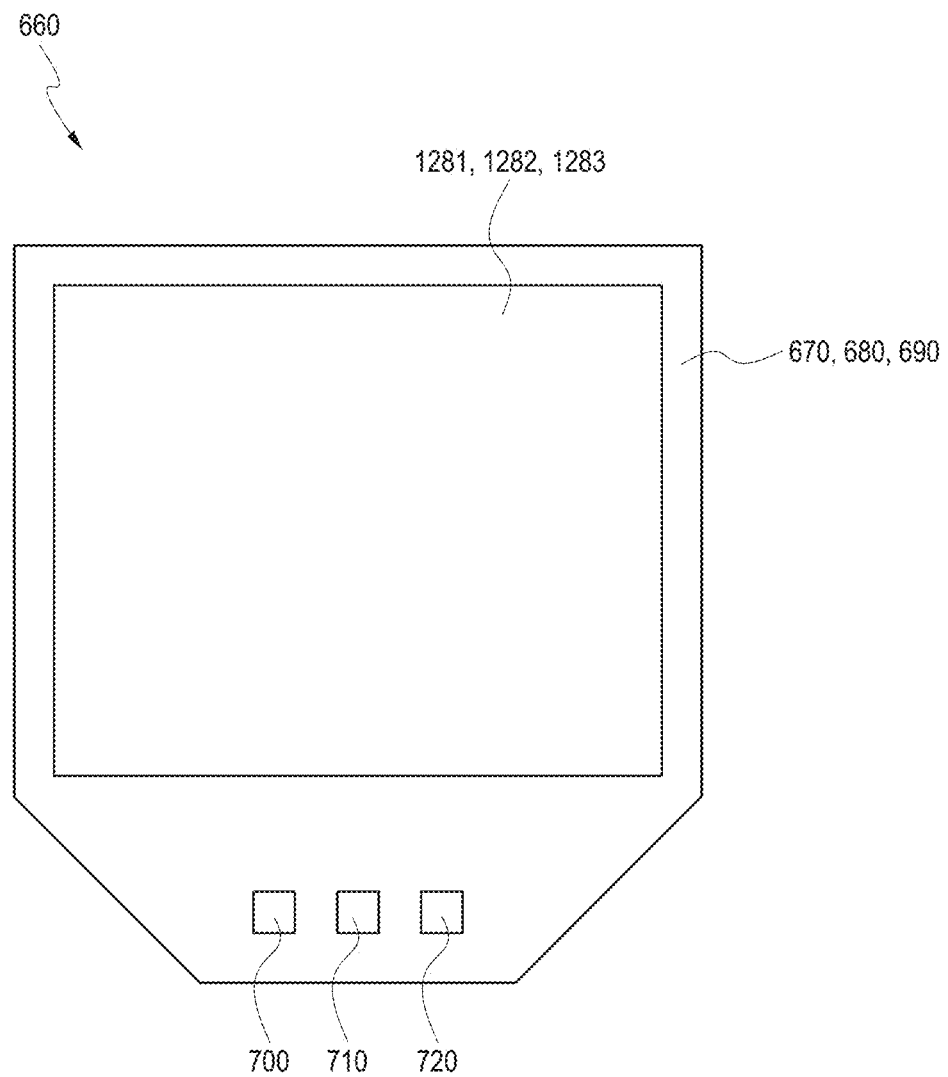
FIG. 9D illustrates a top-down plan view of another example of a plurality of stacked waveguides.

FIG. 9D illustrates a top-down plan view of another example of a plurality of stacked waveguides. As illustrated, the waveguides 670, 680, 690 may be vertically aligned. However, in comparison to the configuration of FIG. 9C, separate light distributing elements 730, 740, 750 and associated out-coupling optical elements 800, 810, 820 are omitted. Instead, light distributing elements and out-coupling optical elements are effectively superimposed and occupy the same area as seen in the top-down view. In some embodiments, light distributing elements (e.g., OPE's) may be disposed on one major surface of the waveguides 670, 680, 690 and out-coupling optical elements (e.g., EPE's) may be disposed on the other major surface of those waveguides. Thus, each waveguide 670, 680, 690 may have superimposed light distributing and out coupling optical elements, collectively referred to as combined OPE/EPE's 1281, 1282, 1283, respectively. Further details regarding such combined OPE/EPE's may be found in U.S. application Ser. No. 16/221,359, filed on Dec. 14, 2018, the entire disclosure of which is incorporated by reference herein. The in-coupling optical elements 700, 710, 720 in-couple and direct light to the combined OPE/EPE's 1281, 1282, 1283, respectively. In some embodiments, as illustrated, the in-coupling optical elements 700, 710, 720 may be laterally shifted (e.g., they are laterally spaced apart as seen in the illustrated top-down view) in have a shifted pupil spatial arrangement. As with the configuration of FIG. 9C, this laterally-shifted spatial arrangement facilitates the injection of light of different wavelengths (e.g., from different light sources) into different waveguides on a one-to-one basis.

Figure 9E:
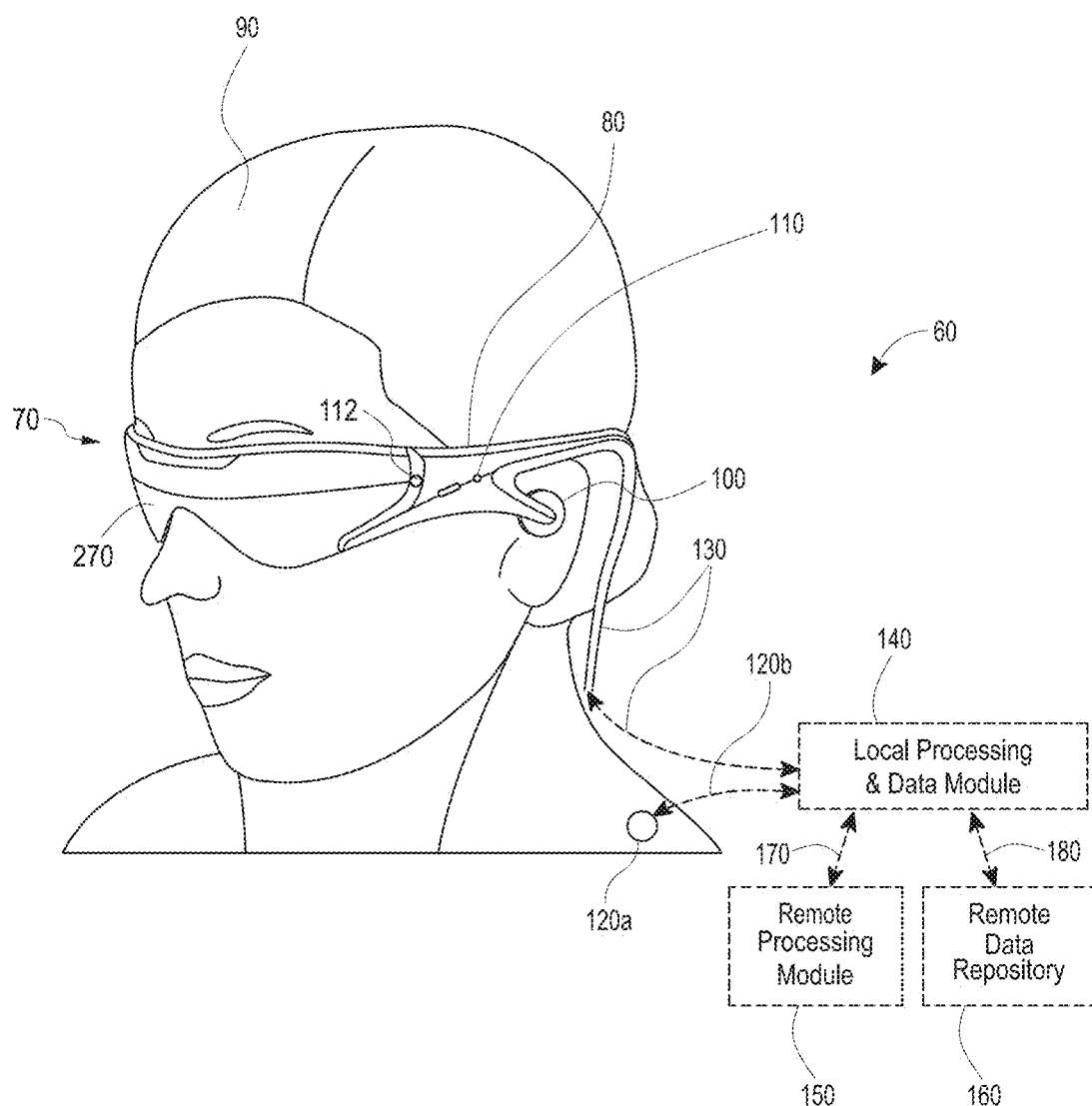
FIG. 9E illustrates an example of wearable display system.

FIG. 9E illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9E, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. The display 70 may include one or more waveguides, such as the waveguide 270, configured to relay in-coupled image light and to output that image light to an eye of the user 90. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9E, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9E, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating virtual content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Orchestrating Application States

As described above, applications may be executed on XR devices to present virtual content to users. For example, each application may render certain virtual content. In this example, the application may obtain virtual content (e.g., from a network address) or may include virtual content to be rendered. An example application described above includes a nutritional application configured to present nutritional information. This application may include, or obtain, information indicative of nutritional information for different food-items. If a user approaches a certain food-item, the application may render virtual content comprising nutritional information for the food-item. In this way, the applications may provide for a wide-breadth of virtual content. As will be described, users may indicate types of virtual content of interest to the users. Applications which provide these indicated types of virtual content may be obtained by the users' XR devices and used to present virtual content.

Each of the applications may be associated with one or more anchor locations. As described above, an application may present virtual content at a specific anchor location in the real-world. These anchor locations may, in some embodiments, represent accurate locations within the real-world. For example, an anchor location may correspond to a certain position on a certain shelf in a certain aisle of a store. Thus, an application may render virtual content at this certain position, such that the virtual content appears to persist in the real-world as the user moves about the store.

With the plethora of applications available to present virtual content, an XR device may be unable to execute the applications due to computational resource limits. As will be described in more detail below, the XR device may utilize example orchestration techniques to control states of applications. Based on this control, only certain applications may be executed at any one time for a user. Other applications may be discarded or set into a "sleep" state. As the user moves about the real-world, states of applications may be rapidly updated to ensure that virtual content within the real-world appears to persist.

Example Block Diagrams—Orchestrating Application States

Figure 10:
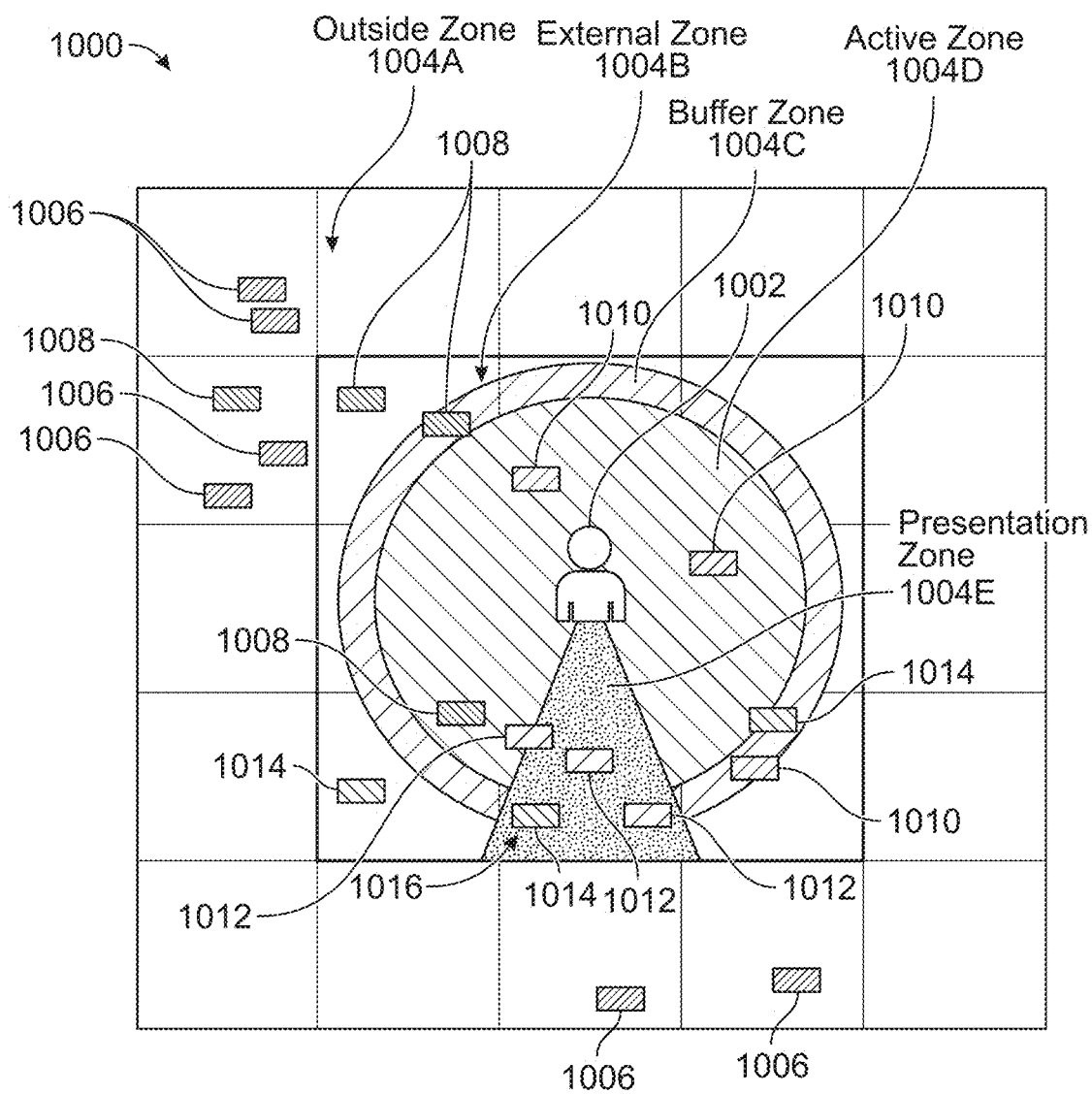
FIG. 10 illustrates a block diagram showing different application states for applications at different proximities to a user of an XR device.

FIG. 10 illustrates a block diagram illustrating different application states of applications 1006-1014 proximate to an XR device 1002 (that is, applications 1006-1014 have associated anchor locations proximate to an XR device 1002). In the example of FIG. 10, a volumetric grid 1000 is illustrated. The volumetric grid 1000 comprises a multitude of cells with the XR device 1002 being included in a central cell. The cells may represent a particular distance (e.g., with respect to the real-world) along two or more axes (e.g., on a plane, or within a three-dimensional volume). Thus, a furthest cell may represent an area or volume of space which is furthest from the XR device 1002. Similarly, the central cell may represent a particular area or volume of space which is closest to the XR device 1002. In some embodiments, the user may not be located in the central cell, in which case a cell further from the user may represent an area or volume of space which is further from the XR device 1002, and a cell closer to the user may represent a particular area or volume of space which is closer to the XR device 1002.

As illustrated, different applications 1006-1014 are included in different cells of the volumetric grid 1000. Each of the illustrated applications 1006-1014 may represent an anchor location associated with the application. The XR device 1002 may, in some embodiments, provide location information to an outside server or system. In response, the outside server or system may provide indications of applications located within a threshold distance of the XR device 1002. In some embodiments, the XR device 1002 may store applications and associated anchor locations. As will be described, certain of the applications may be loaded for execution by the XR device 1002 based on their proximity to the device 1002.

In some embodiments, location information may include global navigation satellite system (GNSS) coordinates of the XR device 1002. In some embodiments, location information may be based on persistent spatial information in the real-world, such as the persistent coordinate frames (PCFs) described herein. Additional description related to PCFs is included, at least, in FIGS. 6B and 14 of U.S. patent application Ser. No. 16/593,745, which forms part of the disclosure as if set forth herein.

While the cells are illustrated as being rectangular, it will be appreciated that other shapes may be used. For example, the cells may be circular, elliptical, or any arbitrary polygonal shape. Additionally, the volumetric grid 1000 depicts a two-dimensional grid of cells. For example, this volumetric grid 1000 may represent an area surrounding the XR device 1002. The area may, in some embodiments, represent an x-direction (e.g., a lateral direction) and a z-direction (e.g., an outward direction from the XR device 1002). In some embodiments, the volumetric grid 1000 may be three-dimensional. For example, there may be additional cells along a y-direction. In this example, applications may thus be positioned at different heights from the XR device. As an example, an application may present virtual content near the top of a room or building.

In the volumetric grid 1000, there are example zones 1004A-1004E which are used to orchestrate the assignment of states to the applications 1006-1014. A first zone, referred to as the outside zone 1004A, may encompass portions of cells which are greater than a threshold distance metric away from the XR device 1002. In some embodiments, applications positioned in this outside zone 1004A may not be loaded by the XR device 1002. In some other embodiments, applications positioned in this outside one 1004A may be loaded (e.g., obtained from an outside system or from memory), but not executed.

A second zone, referred to as the external zone 1004B, may encompass portions of cells closer to the XR device 1002 as compared with the outside zone 1004A. As will be described, applications positions in this external zone 1004B may be loaded by the XR device 1002 and set to a "sleeping" state. For example, the sleeping state may represent that an application (e.g., processes associated with the application) is not consuming computational resources of the XR device 1002.

A third zone, referred to as the buffer zone 1004C, may encompass portions of cells which are proximate to the XR device 1002. As will be described, the buffer zone 1004C may represent a buffer in which applications maintain a same state as compared to a prior state when located in a different zone. A fourth zone, referred to as the active zone 1004D, may encompass portions of cells which are even closer to the XR device 1002. Applications included in this active zone 1004D may be set to an "active" state. In some embodiments, the "active" state may represent an "active+no render" state. For example, the applications may consume computation resources such that they remain active but not render any virtual content via the XR device 1002.

A fifth zone, referred to as the presentation zone 1004E, may encompass portions of cells which are within a display frustum of the XR device 1002. For example, these cells may encompass a real-world area or volume which a user of the XR device 1002 is viewing. Thus, and with respect to an augmented reality display system, if the user is looking down a street, the presentation zone 1004E may encompass portions of the street visible to the user. Similarly, and with respect to a mobile device, the presentation zone 1004E may encompass portions of the street visible to one or more outward facing image sensors of the mobile device. In some embodiments, these image sensors may be oriented to capture images forward of the mobile device, e.g., to mimic the field of view of the user. To determine the presentation zone 1004E with respect to an augmented reality display system, in some embodiments the XR device 1002 may determine a head pose of the user. For example, the XR device 1002 may include an inertial measurement unit (IMU). In this example, the head pose of the user may be determined based on information from the IMU. Based on the determined head pose, the XR device 1002 may determine a field of view of the user.

Additional description related to determining a head pose of a user is included in U.S. Patent Pub. 2019/0188474, which forms part of the disclosure as if set for herein.

Optionally, the XR device 1002 may determine the presentation zone 1004E based on images obtained from one or more outward facing image sensors of the XR device 1002. For example, the XR device 1002 may analyze an image and generate descriptors based on features depicted in the image. The XR device 1002 may then access one or more PCFs associated with a location of the XR device 1002. Based on a comparison of the PCFs with the generated descriptors, the XR device 1002 may determine whether any applications are configured to render virtual content. For example, the XR device 1002 may determine whether any anchor locations are depicted in the obtained images. These applications may be determined by the XR device 1002 to fall within the presentation zone 1004E.

In some embodiments, the presentation zone 1004E may be limited in the z-direction. For example, the presentation zone 1004E may include applications which are within a threshold distance from the user along the z-direction. In some embodiments, the presentation zone 1004E may encompass a full display frustum of the XR device 1002.

As described above, the volumetric grid 1000 may be centered on the XR device 1002. As the XR device 1002 is moved about the world, the volumetric grid 1000 may be updated accordingly. For example, if the XR device 1002 moves laterally to the right, then the illustrated applications 1006-1014 may be moved in the grid 1000 laterally to the left. Additionally, as the XR device 1002 is moved to the right, certain applications may be removed from the volumetric grid 1000. As another example, as the XR device 1002 moves laterally to the right, one or more new applications may be included in the volumetric grid 1000 in the right portion of the grid 1000. In this example, new applications may be discovered and included in the volumetric grid 1000. The new applications will be monitored by the XR device 1002 and assigned states. In contrast, removed applications will not be monitored by the XR device 1002.

The illustrated example includes applications 1006, which may represent applications which have not been loaded by the XR device 1002, but which are within a threshold distance of the XR device 1002. Thus, positions of the XR device 1002 with respect to the applications 1006 may be monitored. If the XR device 1002 moves closer to a particular one of the applications 1006, the particular application may be loaded by the XR device 1002. For example, the particular application may be determined to fall within the external zone 1004B.

Applications 1008 may represent background applications which are typically not associated with presentation of visual virtual content. For example, these applications 1008 may provide audio to the user. In this example, the applications 1008 may represent a radio station, audio cues, audio messages, and so on. Since these background applications 1008 may not consume substantial computing resources and/or their functionality requires that they remain constantly active (and possibly providing output, e.g., audio to the user), they may optionally be loaded by the XR device 1002 regardless of their position within the volumetric grid 1000.

Applications 1010 may represent applications which are active, but not rendering virtual content. As illustrated in FIG. 10, these applications 1010 may be positioned outside of the display frustum of the XR device 1002. Additionally, these applications may be included in the active zone 1004D such that they can rapidly present virtual content if they fall within the presentation zone 1004E based on adjustment of position of pose of the XR device 1002.

Applications 1012 may represent applications which are active, and which are rendering virtual content (and/or other content, such as audio) to the user of the XR device 1002. As illustrated in FIG. 10, these applications 1012 are positioned within the presentation zone 1004E. For example, these applications are within the display frustum of the XR device 1002. Based on movement of the XR device 1002, a particular one of the applications 1012 may move outside of the presentation zone 1004E. Advantageously, the particular application may be rapidly adjusted in state, such that the XR device 1002 causes it to cease rendering virtual content.

Applications 1014 may represent applications which have been loaded, but which have been set to be sleeping. Thus, these applications 1014 may be inactive. As illustrated, a particular application 1016 of the applications 1014 is included within the display frustum of the XR device 1002. However, this particular application 1016 is included in the buffer zone 1004C described above. The particular application 1016 may, as an example, have moved into the buffer zone 1004C from the external zone 1004B based on movement of the XR device 1002. The buffer zone 1004C may provide a zone in which the states of applications do not change from prior states. If the XR device 1002 is moved along a z-direction towards a bottom of the illustrated figure, the particular application 1016 may fall within the presentation zone 1004E. Thus, the XR device may cause the particular application to be active and set to rendering virtual content.

Figure 11:
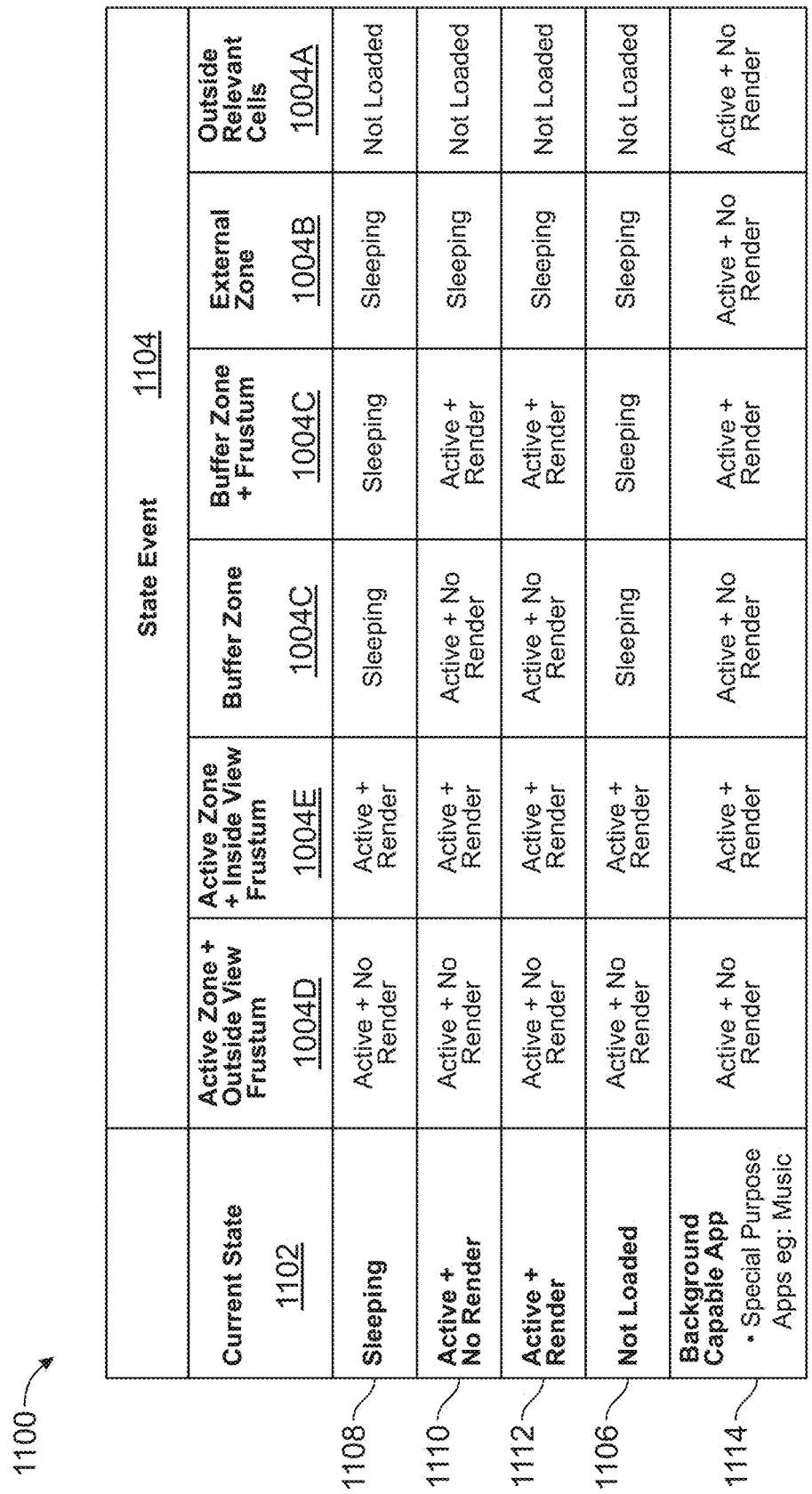
FIG. 11 illustrates an example state diagram associated with assigning states to applications.

FIG. 11 illustrates an example state diagram 1100 associated with assigning states to applications. In the illustrated example, a table is included which indicates a current state 1102 of an application along with a result of a state event 1104. For example, the current state may be determined based on an application's position within the volumetric grid 1000 of FIG. 10. The state event 1104 may represent a movement of the application into a different position within the volumetric grid 1000. As an example, the application may have moved to a different one of the zones 1004A-1004E described above due to movement, or adjustment of pose, of an XR device.

The state diagram 1100 may be used by an XR device to orchestrate states of applications. As described in FIG. 10, an XR device may identify applications proximate to the XR device. In some embodiments, a volumetric grid may be used to determine a particular state of each of the identified applications.

Identified applications which are furthest from the XR device may be set to current state 1102 of "not loaded" 1106. For example, these applications may have been retrieved from an outside system but not yet loaded by the XR device. As another example, these applications may have been not yet retrieved from the outside system. As another example, these applications may be stored in memory of the XR device but not loaded.

Based on movement of the XR device, or optionally movement of an application, the "not loaded" applications 1106 may be set to a new state based on the result of a state event 1104. For example, the XR device may move such that an application is positioned within the external zone 1004B. In this example, the XR device may set a state of the application to "sleeping".

Applications which are set to a "sleeping" state 1108, may be similarly updated based on a state event 1104. For example, a state event 1104 may result in the application being positioned within a buffer zone 1004C. In this example, the application may remain set to a "sleeping" state. As another example, a state event 1104 may result in the application being positioned within zones 1104D or 1104E. In this example, the application may be updated to be active. If the application is within zone 1104E, the application may render virtual content to a user of the XR device.

Applications which are set to an "active+no render" state 1110 may be updated based on a state event 1104. For example, an application may be updated in position to fall within a presentation zone 1004E. In this example, the application may therefore be visible within a display frustum of the XR device. Thus, the state may be updated to "active+render". However, if the application moves further from the XR device, it may be updated to a "sleeping" or "not loaded" state.

Certain applications may represent background applications, such as applications to provide audio or music. These applications may be assigned a "background capable" state 1114. Since these applications may not consume substantial resources and/or are required to constantly be active and provide output, they may be loaded regardless of position within the volumetric grid of FIG. 10. For example, they may be loaded by the XR device when they are within a threshold distance of the XR device.

In some embodiments, these background applications may be set to an "active+render" state. This may allow for a background application to output content to the user, such as audio content. This may also allow for a background application to provide virtual content to a user (e.g., visual content). For example, they may typically provide audio or music but may provide virtual content depending on certain triggers. An example trigger may include the user providing user input to cause presentation of virtual content. As an example, the user may trigger presentation of a control menu associated with a music application. Thus, the user may interact with virtual content comprising the control menu.

Thus, an XR device may assign states to applications based on proximity of the applications to the XR device. As described above, an application may have one, two, or more anchor locations. For example, a nutritional application may have a first anchor location associated with a first item and a second anchor location associated with a second item. The XR device may assign a state to the nutritional application based on a highest state of the anchor locations. For example, if the first anchor location is within the presentation zone 1104E device and the second anchor location is within the external zone 1004B, the application may be assigned a state of "active+render." In this way, the application may present virtual content via the XR device.

Example Flowcharts—Orchestrating Application States

Figure 12:
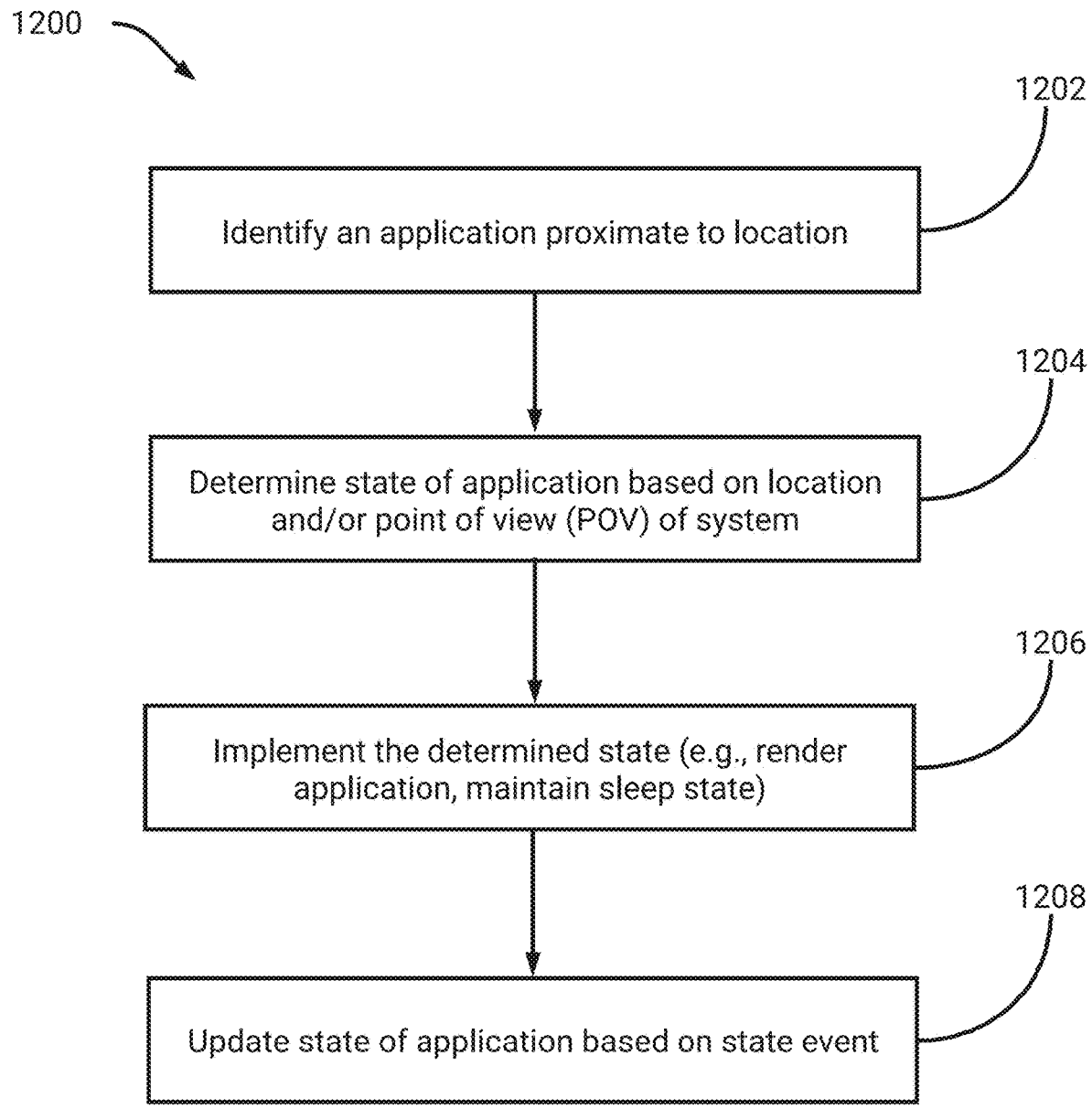
FIG. 12 is a flowchart for an example process for updating a state of an application.

FIG. 12 is a flowchart of an example process 1200 for updating a state of an application. For convenience, the process 1200 will be described as being performed by a system of one or more processors. For example, the system may be an XR device (e.g., a wearable device, such as the display system 60; a smart phone; a tablet; and so on).

At block 1202, the system identifies an application proximate to a location of the system. As described in FIGS. 10-11, the system may provide location information to an outside system in communication (wired or wireless communication) with the system. Example location information may include GNSS coordinates, or location information associated with persistent coordinate frames (PCFs) as described above. In response, the outside system may identify one or more applications with anchor points located within a threshold distance of the system. In some embodiments, the system may store applications and may identify whether any anchor points are located within a threshold distance of the system.

At block 1204, the system determines a state of the application. The system may determine the state based on a distance metric of the application from the system. Additionally, the system may determine the state based on a point of view of the system. In some embodiments, the system may access a volumetric grid as described in FIG. 10. Based on the application's position within the volumetric grid, the application's state may be determined. For example, if the application is positioned within a display frustum of the system (e.g., the presentation zone 1004E of FIG. 10), the application may be set to an "active+render" state.

At block 1206, the system implements the determined state. If the application is determined to be within a threshold distance of the system, the application may be loaded by the system. For example, the application may be retrieved from an outside system via a network connection. As another example, the application may be loaded from storage of the system. If the application is determined to be even closer to the system, the application may be set to an "active" state. Thus, the system may execute the application such that it is consuming computation resources. Optionally, the system may cause the application to render virtual content based on the application being set to an "active+render" state.

At block 1208, the system updates the state of the application based on a state event. As described in FIG. 11, an application's state may be adjusted based on movement of the system. For example, the system may be adjusted in location. In this example, a user may adjust his/her two-dimensional location in the real-world. The user may also adjust a height of the system (e.g., the user may ascend stairs, may move upwards in a building, and so on). As another example, a point of view of the system may be adjusted. For example, and with respect to an augmented reality display device, a head pose of a user may be adjusted. As another example, for example with respect to a smart phone or tablet, a point of view of one or more outward facing cameras may be adjusted due to movement of the smart phone or tablet.

In some embodiments, a state event may represent an application adjusting its own position. For example, an anchor location associated with an application may be adjusted. As an example, an application may cause rendering of a virtualized animal or creature. In this example, the virtualized animal or creature may be adjusted to in location periodically. For example, it may be associated with a certain street at a particular time and then associated with a different street at a different time. Thus, the application may update its associated anchor location. In some embodiments, the application may receive information from an outside system. In this way, any instance of the application executing on a multitude of systems may receive updated locations at a same, or similar, time.

Based on the state event, the system may update a state associated with the application. For example, the system may use the state diagram described in FIG. 11 to assign a new state.

For ease of description, the description above focused on applications being loaded by a system, such as an augmented reality display device. However, it should be appreciated that in some embodiments applications may be executed by an outside system (e.g., a cloud system). For example, an application may be executed by the outside system and virtual content may be provided (e.g., streamed) to the system for presentation. Similar to the above, the system may provide location information to the outside system. Based on the location information, the system may determine a state for any application within a threshold distance of the system. Similarly, based on the determined states the outside system may render certain virtual content and provide the rendered virtual content for presentation to the system. The rendered virtual content may be provided along with information usable to position the virtual content at specific anchor locations. For example, the information may reflect PCFs such that the system may place virtual content based on comparisons of descriptors.

Example Flowcharts—Filtering Applications

In some embodiments, there may be too many applications for an XR device to load and/or render content for. For example, there may be greater than a threshold number of applications located within a threshold distance of an XR device. Thus, the XR device may be unable to load all of the applications within the threshold distance. Additionally, the XR device may have limited bandwidth with respect to a network connection. Thus, the XR device may be unable to quickly obtain (e.g., download) the applications from an outside system, such that a user of the XR device perceives virtual content popping into his/her field of view as applications are loaded, rather than seeing a seamless presentation of content.

As described below, the XR device may optionally filter applications, to thereby load applications which are determined to be of interest to a user.

Figure 13:
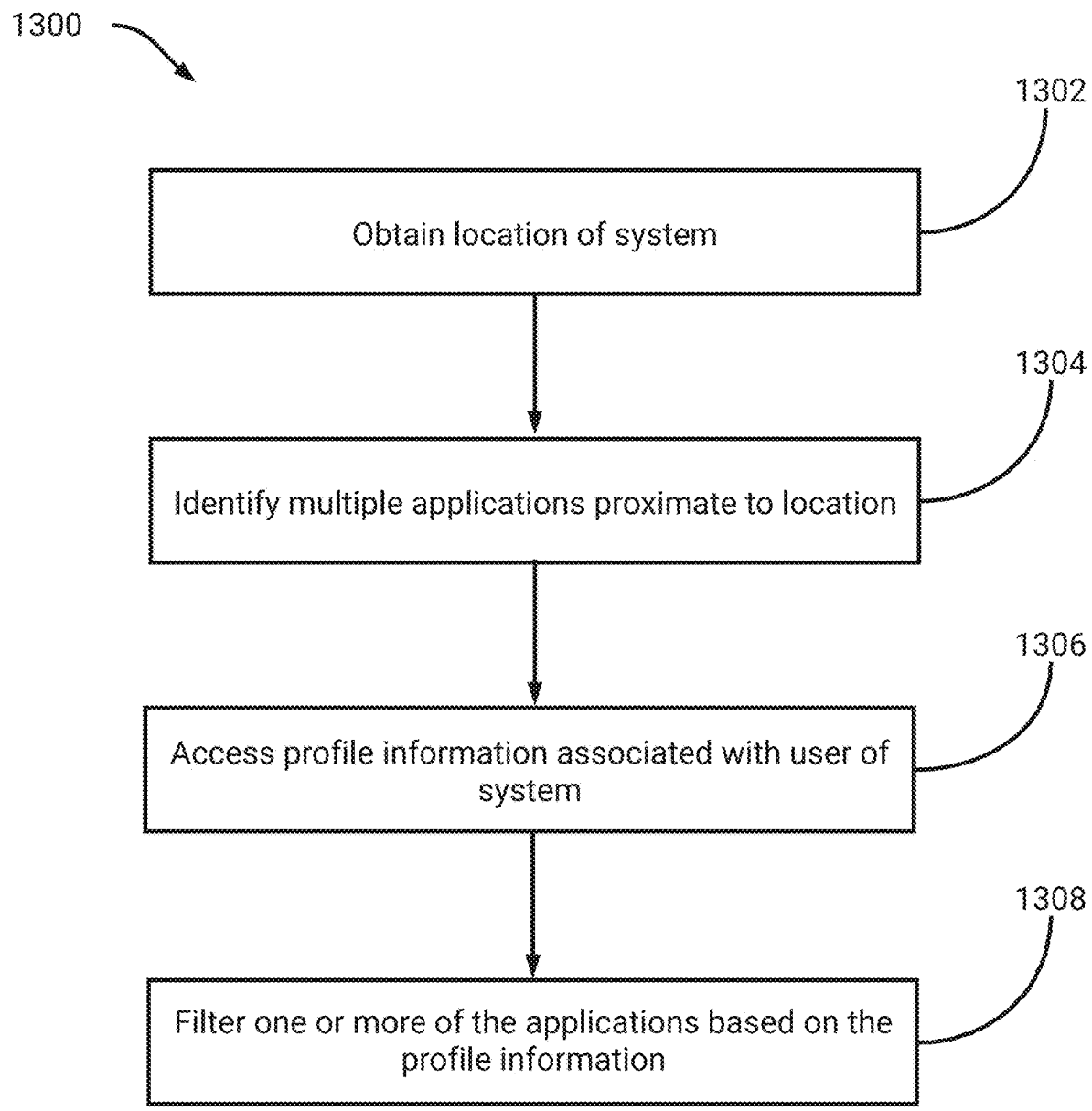
FIG. 13 is a flowchart for an example process for filtering applications.

FIG. 13 is a flowchart of an example process 1300 for filtering applications. For convenience, the process 1300 will be described as being performed by a system of one or more processors. For example, the system may be an XR device (e.g., a wearable device, such as the display system 60; a smart phone; a tablet; and so on).

At block 1302, the system obtains location information and identifies applications proximate to its location at block 1304. As described above, the system may be configured to load a threshold number of applications. For example, the system may have limited memory, computational resources, and so on. If the system identifies greater than the threshold number of applications, the system may filter the identified applications.

At block 1306, the system accesses profile information associated with a user of the system. The profile information may indicate content preferences of the user. For example, the user may be interested in nutritional information. Thus, the profile information may reflect this interest. As another example, the user may have indicated that he/she is not interested in viewing virtual content associated with games. Certain applications may be designed to provide gameplay experiences to users of the applications.

At block 1308, the system filters one or more of the applications. The system may remove one or more of the identified applications from consideration based on the profile information. Thus, these removed applications may not be loaded by the system. For example, the system may analyze textual descriptions of applications or other metadata. The system may then remove applications which are not in accordance with the profile information.

While the description above focused on profile information, other information may additionally, or alternatively, be used to filter applications. For example, contextual information associated with use of the system may be analyzed. In this example, the user of the system may be using the system for a certain context. As an example, the system may be using the system to provide directions to a destination. In this example, the system may filter applications which are not related to this context. For example, it may remove applications associated with gaming. As another example, it may remove applications which present information describing alternative destinations. For example, a travel application may indicate important landmarks in a city. Since the user, however, has indicated a preference for directions to a specific location these landmarks may not be presented.

The system may also use visibility information. For example, the system may filter applications which are configured to present virtual content at anchor locations with limited visibility to the user. As an example, if the user is walking down a street the system may remove applications with anchor locations which are blocked from the user's point of view. As another example, the system may remove applications with anchor locations which are higher, or lower, than the user is viewing. In some embodiments, the system may use depth plane information to filter applications. For example, the system may prefer applications which are to be presented on a same depth plane as each other. Thus, an application which is to present virtual content on a different depth plane may be disfavored. As another example, an application which is to present virtual content in such close proximity to the user as to cause user discomfort may be disfavored.

The system may also use usability and/or interactability information. For example, certain applications may have low usability. This usability information may be determined from user ratings of applications or may be determined by an outside system based on analyzing interactions with virtual content from applications. Similarly, certain applications may have high interactability. As an example, virtual content which is more interactive, or less interactive, may be filtered. An example of interactivity may include virtual content which is responsive to user input. Optionally, a user may set a preference to filter more interactive, or less interactive, virtual content. In some embodiments, intractability information may be used. As an example, these applications may consume too great of computational resources. If they are otherwise not indicated to be of particular interest by the user, they may be filtered.

Thus, in some embodiments the system may filter applications which are proximate to the system. For example, certain applications may be removed based on user profile information of a user of the system. In some embodiments, the remaining applications may still be too great for the computational resources of the system. For example, the system may be unable to render virtual content for the remaining applications. As described below, with respect to FIG. 14, the system may optionally additionally or alternatively rank the applications and render according to rank.

FIG. 14 is a flowchart of an example process 1400 for rendering applications based on a ranking of the applications. For convenience, the process 1400 will be described as being performed by a system of one or more processors. For example, the system may be an XR device (e.g., a wearable device, such as the display system 60; a smart phone; a tablet; and so on).

At block 1402, the system obtains a location of the system and identifies multiple applications proximate to the system at block 1402. As described in FIG. 13, the identified applications may be filtered. However, even with filtering there may be too many applications which are configured to present virtual content via the system.

At block 1406, the system ranks the filtered applications according to one or more metrics. The system can assign a priority to the filtered applications. For example, the priority of an application may be determined based on a field of view of the system, a known priority of the application, the user's movement, reachability of the application, and so on. With respect to field of view, the system may prioritize applications configured to render virtual content entirely within the field of view of the system. Additionally, the system may prioritize applications configured to render virtual content which encompasses a greater percentage of the field of view.

With respect to known priority, certain applications may have an assigned priority or importance. An example application with a high priority may be an amber alert application. Another example application with a high priority may be a messaging application. Thus, these applications may be ranked higher than other applications. With respect to user movement, certain applications which are expected to remain active based on a trajectory of the system may be ranked higher. For example, a first application may be expected to remain active based on the user moving down a street. As another example, a second application may be expected to be placed into a sleep state based on the user continuing down the street.

Similarly, and with respect to reachability, certain applications may present virtual comment at anchor locations accessible to the user. For example, the virtual content may be presented at substantially eye-level such that the user may interact with the virtual content. In contrast, certain other applications may present virtual content at anchor locations which are inaccessible to the user. For example, if the user is walking down a street, virtual content presented on a window of a second story building may be inaccessible to the user. Thus, this virtual content may be assigned a lower ranking.

The above-described metrics may be aggregated by the system to determine a ranking of each of the applications. Optionally, the system may combine the process of FIG. 13 with the process 1400. For example, the system may incorporate user profile information, along with the above-described metrics, to reduce a number of applications proximate to the user.

At block 1408, the system renders applications based on the ranking. The system may cause applications to render virtual content according to respective ranking. After a threshold number of applications render virtual content, the system may cause remaining applications to be placed into a "sleep" or "active+no render" state. The threshold number of applications may be based on available computational resources of the system. For example, if the system determines that it lacks sufficient memory, or that virtual content is going to be rendered at less than a threshold frame rate, and so on, the system may adjust states of the remaining applications.

Other Embodiments

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the virtual content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

In addition, it will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims.

Accordingly, the claims are not intended to be limited to the embodiments shown herein, but are to be accorded the widest scope consistent with this disclosure, the principles and the novel features disclosed herein.

What is claimed is:

1. A method implemented by a cross-reality (XR) device comprising one or more processors, the XR device configured to present virtual content to a user of the XR device at a plurality of depth planes, the method comprising:
    obtaining information identifying a plurality of applications with respective anchor locations located within a first threshold distance metric of the XR device, wherein an anchor location corresponds to a real-world location at which virtual content is to be presented by an application;
    filtering the identified applications to maintain a subset of the applications, wherein filtering is triggered based on a determination that the plurality of applications located within the first threshold distance metric exceeds a threshold number of applications,
    wherein the filtering is based on a context associated with use of the XR device and depth plane information associated with the identified applications, and wherein the depth plane information indicates a respective depth plane at which each of the identified applications is to present virtual content;
    determining respective states, selected from a plurality of states, to be assigned to the subset of the applications, the states being determined based on a proximity of the anchor locations to the XR device;
    implementing the states, wherein a first application of the subset of the applications is assigned a state to render virtual content, and wherein the first application presents virtual content via the XR device at a first anchor location; and
    in response to movement of the XR device, determining updated states for one or more applications included in the subset.

2. The method of claim 1, further comprising:
    providing, to an outside system, information indicative of a location of the XR device; and
    receiving, from the outside system, information identifying the applications.

3. The method of claim 2, wherein in response to movement of the XR device, a second application is determined to have an anchor location within a second threshold distance metric, and wherein the second application is received from the outside system for execution.

4. The method of claim 1, wherein determining a state of the first application comprises:
    identifying a first zone, of a plurality of zones, in which the first application is positioned, the zones being included in a volumetric grid centered on a location of the XR device, wherein the first zone is associated with the determined state.

5. The method of claim 4, wherein the first zone indicates the first application is positioned within a display frustum of the XR device, such that the first application is set to an active state associated with rendering virtual content.

6. The method of claim 4, wherein a second zone indicates an application is positioned outside of a display frustum of the XR device, such that the application is set to a state not associated with rendering virtual content.

7. The method of claim 4, wherein the plurality of zones are associated with states comprising: an application being set to active and associated with rendering virtual content, the application being set to active and not associated with rendering virtual content, the application being set to a sleep state, or the application being set to an unloaded state.

8. The method of claim 1, wherein based on movement of the XR device, a new application is identified as being within the first threshold distance metric of the XR device, and wherein a state is determined for the new application.

9. The method of claim 1, further comprising:
    identifying greater than a particular threshold number of applications with determined states associated with being active and rendering virtual content;
    ranking the particular threshold number of applications according to one or more metrics; and
    implementing the determined states, wherein one or more applications of the particular threshold number of applications present virtual content according to the ranking, and wherein remaining applications of the threshold number of applications are set to a state associated with no rendering virtual content.

10. The method of claim 1, wherein the XR device is an augmented reality display device configured to present virtual content on a plurality of depth planes, wherein each depth plane is associated with respective accommodative cues.

11. The method of claim 1, wherein the first anchor location is determined based on one or more images obtained by one or more outward-facing image sensors of the XR device in comparison with stored persistent information associated with a real world proximate to the XR device.

12. The method of claim 1, wherein the first application presents virtual content in a prism representing a volume of space, the prism being associated with the first anchor location.

13. A system comprising one or more processors, the system configured to present virtual content to a user of the system, wherein the system further comprises non-transitory computer storage media storing instructions that, when executed by the one or more processors, cause the one or more processors to perform operations comprising:
obtaining information identifying a plurality of applications with respective anchor locations located within a first threshold distance metric of a cross-reality (XR) device, wherein an anchor location corresponds to a real-world location at which virtual content is to be presented by an application;
filtering the identified applications to maintain a subset of the applications, wherein filtering is triggered based on a determination that the plurality of applications located within the first threshold distance metric exceeds a threshold number of applications,
wherein the filtering is based on a context associated with use of the XR device and depth plane information associated with the identified applications, and wherein the depth plane information indicates a respective depth plane, of a plurality of depth planes, at which each of the identified applications is to present virtual content;
determining respective states, selected from a plurality of states, to be assigned to the subset of the applications, the states being determined based on a proximity of the anchor locations to the XR device;
implementing the states, wherein a first application of the subset is assigned a state to render virtual content, and wherein the first application presents virtual content via the XR device at a first anchor location; and
in response to movement of the XR device, determining updated states for one or more applications included in the subset.

14. The system of claim 13, wherein determining a state of the first application comprises:
identifying a first zone, of a plurality of zones, in which the first application is positioned, the zones being included in a volumetric grid centered on a location of the XR device, wherein the first zone is associated with the determined state.

15. The system of claim 14, wherein the first zone indicates the first application is positioned within a display frustum of the XR device, such that the first application is set to an active state associated with rendering virtual content, and wherein a second zone indicates an application is positioned outside of the display frustum of the XR device, such that the application is set to a state not associated with rendering virtual content.

16. The system of claim 14, wherein the plurality of zones are associated with states comprising: an application being set to active and associated with rendering virtual content, the application being set to active and not associated with rendering virtual content, the application being set to a sleep state, or the application being set to an unloaded state.

17. The system of claim 13, wherein the operations further comprise:
identifying greater than a particular threshold number of applications with determined states associated with being active and rendering virtual content;
ranking the particular threshold number of applications according to one or more metrics; and
implementing the determined states, wherein one or more applications of the particular threshold number of applications present virtual content according to the ranking, and wherein remaining applications of the threshold number of applications are set to a state associated with no rendering virtual content.

18. Non-transitory computer storage media storing instructions that, when executed by a cross-reality (XR) device comprising one or more processors and configured to present virtual content to a user of the XR device, cause the one or more processors to perform operations comprising:
obtaining information identifying a plurality of applications with respective anchor locations located within a first threshold distance metric of the XR device, wherein an anchor location corresponds to a real-world location at which virtual content is to be presented by an application;
filtering the identified applications to maintain a subset of the applications, wherein filtering is triggered based on a determination that the plurality of applications located within the first threshold distance metric exceeds a threshold number of applications,
wherein the filtering is based on a context associated with use of the XR device and depth plane information associated with the identified applications, and wherein the depth plane information indicates a respective depth plane, of a plurality of depth planes, at which each of the identified applications is to present virtual content;
determining respective states, selected from a plurality of states, to be assigned to the subset of the applications, the states being determined based on a proximity of the anchor locations to the XR device;
implementing the states, wherein a first application of the subset is assigned a state to render virtual content, and wherein the first application presents virtual content via the XR device at a first anchor location; and
in response to movement of the XR device, determining updated states for one or more applications included in the subset.

19. The computer storage media of claim 18, wherein determining a state of the first application comprises:
identifying a first zone, of a plurality of zones, in which the first application is positioned, the zones being included in a volumetric grid centered on a location of the XR device, wherein the first zone is associated with the determined state.

20. The computer storage media of claim 19, wherein the plurality of zones are associated with states comprising: an application being set to active and associated with rendering virtual content, the application being set to active and not associated with rendering virtual content, the application being set to a sleep state, or the application being set to an unloaded state.

21. The method of claim 1, wherein filtering based on the depth plane information comprises favoring first applications which are to present virtual content at a first depth plane and disfavoring second applications which are to present virtual content at a second depth plane.

* * * * *